US009950752B2

(12) United States Patent
Baker et al.

(10) Patent No.: US 9,950,752 B2
(45) Date of Patent: Apr. 24, 2018

(54) AERODYNAMIC REAR DRAG REDUCTION SYSTEM FOR A TRAILER

(71) Applicant: WABASH NATIONAL, L.P., Lafayette, IN (US)

(72) Inventors: Leonard W. Baker, Lafayette, IN (US); Brian N. Haan, Lafayette, IN (US); Brandon S. Mullen, Lebanon, IN (US)

(73) Assignee: Wabash National, L.P., Lafayette, IN (US)

( * ) Notice: Subject to any disclaimer, the term of this patent is extended or adjusted under 35 U.S.C. 154(b) by 200 days.

(21) Appl. No.: 15/044,220

(22) Filed: Feb. 16, 2016

(65) Prior Publication Data

US 2016/0236726 A1 Aug. 18, 2016

Related U.S. Application Data

(60) Provisional application No. 62/116,891, filed on Feb. 16, 2015.

(51) Int. Cl.
*B62D 35/00* (2006.01)

(52) U.S. Cl.
CPC .................................. *B62D 35/001* (2013.01)

(58) Field of Classification Search
CPC .... B62D 35/001; B62D 35/007; B62D 35/00; B62D 37/02; B60J 5/108
USPC ............. 296/180.4, 180.1, 180.5, 181.5, 152
See application file for complete search history.

(56) References Cited

U.S. PATENT DOCUMENTS

| 2,933,344 | A | 4/1960 | Shumaker |
| 3,010,754 | A | 11/1961 | Shumaker |
| 3,276,811 | A | 10/1966 | Schmidt |
| 3,596,975 | A | 8/1971 | Stephen |
| 3,960,402 | A | 6/1976 | Keck |

(Continued)

FOREIGN PATENT DOCUMENTS

| DE | 102008036888 A1 | 2/2010 |
| EP | 0197239 A2 | 10/1986 |

(Continued)

OTHER PUBLICATIONS

Photograph 1 of the Wabco OptiFlow device taken at IAA convention in Germany on Sep. 28, 2014.

(Continued)

*Primary Examiner* — Jason S Morrow
*Assistant Examiner* — E Turner Hicks
(74) *Attorney, Agent, or Firm* — Carli E. Stewart

(57) ABSTRACT

An aerodynamic rear drag reduction system is configured to be coupled to a frame assembly of a trailer including a rear frame and a rear swing door. The drag reduction system includes a top panel configured to be coupled to a top portion of the rear swing door to extend generally horizontally along a top portion of the rear frame of the trailer. The drag reduction system also includes a folding mechanism coupled to the top panel to move the top panel between a fully-deployed position wherein the top panel is configured to extend rearwardly generally away from the rear end of the trailer and a collapsed position wherein the top panel is configured to lie generally adjacent the rear swing door of the trailer. The folding mechanism is configured to be coupled to a door locking mechanism of the trailer.

22 Claims, 26 Drawing Sheets

(56) References Cited

U.S. PATENT DOCUMENTS

| | | |
|---|---|---|
| 3,999,797 A | 12/1976 | Kirsch et al. |
| 4,142,755 A | 3/1979 | Keedy |
| 4,214,787 A | 7/1980 | Chain |
| 4,309,053 A | 1/1982 | Lett |
| 4,316,630 A | 2/1982 | Evans |
| 4,320,920 A | 3/1982 | Goudey |
| 4,357,045 A | 11/1982 | Kinford, Jr. |
| 4,417,760 A | 11/1983 | Koch |
| 4,421,354 A | 12/1983 | Lemaster |
| 4,671,555 A | 6/1987 | Linz et al. |
| 4,682,808 A | 7/1987 | Bilanin |
| 4,735,381 A | 4/1988 | Wood |
| 4,809,003 A | 2/1989 | Dominek et al. |
| 4,881,772 A | 11/1989 | Feinberg |
| 4,978,162 A | 12/1990 | Labee' |
| 5,112,120 A | 5/1992 | Wood |
| 5,199,762 A | 4/1993 | Scheele et al. |
| 5,280,990 A | 1/1994 | Rinard |
| 5,374,013 A | 12/1994 | Bassett et al. |
| 5,382,070 A | 1/1995 | Turner |
| 5,498,059 A * | 3/1996 | Switlik ............... B62D 35/001 296/180.1 |
| 5,658,038 A | 8/1997 | Griffin |
| 5,823,610 A | 10/1998 | Ryan et al. |
| 5,901,925 A | 5/1999 | McGrath et al. |
| 5,901,929 A | 5/1999 | Banks |
| 6,092,861 A | 7/2000 | Whelan |
| 6,131,853 A | 10/2000 | Bauer et al. |
| 6,241,302 B1 | 6/2001 | Rehkopf |
| 6,257,654 B1 | 7/2001 | Boivin et al. |
| 6,286,892 B1 | 9/2001 | Bauer et al. |
| 6,485,087 B1 | 11/2002 | Roberge et al. |
| 6,616,218 B2 | 9/2003 | Bauer et al. |
| 6,666,498 B1 | 12/2003 | Whitten |
| 6,685,256 B1 | 2/2004 | Schermer |
| 6,742,616 B2 * | 6/2004 | Leban ............... B62D 35/001 180/116 |
| 6,799,791 B2 | 10/2004 | Reiman et al. |
| 6,854,788 B1 | 2/2005 | Graham |
| 6,959,958 B2 | 11/2005 | Basford |
| 6,986,544 B2 | 1/2006 | Wood |
| 7,008,005 B1 | 3/2006 | Graham |
| 7,207,620 B2 | 4/2007 | Cosgrove et al. |
| 7,240,958 B2 | 7/2007 | Skopic |
| 7,255,387 B2 | 8/2007 | Wood |
| 7,318,620 B2 | 1/2008 | Wood |
| 7,431,381 B2 | 10/2008 | Wood |
| 7,484,791 B1 | 2/2009 | Chen |
| 7,537,270 B2 | 5/2009 | O'Grady |
| 7,585,015 B2 | 9/2009 | Wood |
| 7,618,086 B2 | 11/2009 | Breidenbach |
| 7,625,034 B1 | 12/2009 | Fitzgerald |
| 7,641,262 B2 | 1/2010 | Nusbaum |
| 7,699,382 B2 | 4/2010 | Roush |
| 7,740,304 B1 | 6/2010 | Breu |
| 7,748,771 B2 | 7/2010 | Distel et al. |
| 7,765,044 B2 | 7/2010 | Neuburger |
| 7,784,854 B2 | 8/2010 | Breidenbach |
| 7,837,254 B2 | 11/2010 | Reiman et al. |
| 7,845,708 B2 | 12/2010 | Breidenbach |
| 7,850,224 B2 | 12/2010 | Breidenbach |
| 7,854,468 B2 | 12/2010 | Vogel et al. |
| 7,857,376 B2 | 12/2010 | Breidenbach |
| 7,862,102 B1 | 1/2011 | Benton |
| 7,950,720 B2 | 5/2011 | Skopic |
| 7,976,096 B2 | 7/2011 | Holubar |
| 8,007,030 B2 | 8/2011 | Wood |
| 8,025,329 B1 | 9/2011 | Kron |
| 8,025,330 B2 | 9/2011 | Reiman et al. |
| 8,033,594 B2 | 10/2011 | Nusbaum |
| 8,091,951 B1 | 1/2012 | Fitzgerald |
| 8,100,461 B2 | 1/2012 | Smith et al. |
| 8,136,868 B2 | 3/2012 | Nusbaum |
| 8,177,287 B2 | 5/2012 | Vogel et al. |
| 8,196,993 B2 | 6/2012 | Smith et al. |
| 8,196,994 B2 | 6/2012 | Chen |
| 8,196,995 B2 | 6/2012 | Chen |
| 8,235,456 B2 | 8/2012 | Nusbaum |
| 8,251,436 B2 | 8/2012 | Henderson et al. |
| 8,272,680 B2 | 9/2012 | Breidenbach |
| 8,303,025 B2 | 11/2012 | Senatro |
| 8,342,594 B2 | 1/2013 | Benton |
| 8,342,595 B2 | 1/2013 | Henderson et al. |
| 8,360,507 B2 | 1/2013 | Benton |
| 8,360,509 B2 | 1/2013 | Smith et al. |
| 8,360,510 B2 | 1/2013 | Smith et al. |
| 8,382,194 B2 | 2/2013 | Wood |
| 8,480,161 B2 | 7/2013 | Pfaff |
| 8,480,162 B2 | 7/2013 | Breidenbach |
| 8,491,036 B2 | 7/2013 | Henderson et al. |
| 8,492,036 B2 | 7/2013 | Kim |
| 8,579,357 B2 | 11/2013 | Nusbaum |
| 8,608,228 B2 | 12/2013 | Visentin |
| 8,622,461 B2 | 1/2014 | Breidenbach |
| 8,672,391 B1 | 3/2014 | Cobb |
| 8,684,447 B2 | 4/2014 | Henderson et al. |
| 8,697,047 B2 | 4/2014 | LaBuannec et al. |
| 8,708,399 B2 | 4/2014 | Smith et al. |
| 8,746,779 B1 | 6/2014 | Mazyan |
| 8,770,649 B2 | 7/2014 | Praskovsky et al. |
| 8,770,650 B1 | 7/2014 | Brosseau |
| 8,777,297 B2 | 7/2014 | Meredith et al. |
| 8,783,757 B2 | 7/2014 | Henderson et al. |
| 9,056,636 B2 | 5/2015 | Henderson et al. |
| 9,049,609 B1 | 6/2015 | Reeves et al. |
| 9,139,238 B2 | 9/2015 | Visser |
| 9,283,996 B2 | 3/2016 | Meredith et al. |
| 9,333,993 B2 | 5/2016 | Telnack |
| 9,371,097 B1 | 6/2016 | Conny |
| 9,522,706 B1 * | 12/2016 | Breidenbach ........ B62D 35/001 |
| 2007/0089531 A1 | 4/2007 | Wood |
| 2008/0116715 A1 | 5/2008 | Steel |
| 2008/0157560 A1 | 7/2008 | Spector |
| 2009/0026797 A1 | 1/2009 | Wood |
| 2009/0200834 A1 * | 8/2009 | Vogel ................... B62D 35/001 296/180.3 |
| 2009/0236872 A1 | 9/2009 | Wood |
| 2010/0106380 A1 | 4/2010 | Salari et al. |
| 2010/0194144 A1 | 8/2010 | Sinha |
| 2011/0084516 A1 * | 4/2011 | Smith ................... B62D 35/001 296/180.4 |
| 2011/0115254 A1 | 5/2011 | Skopic |
| 2012/0126572 A1 | 5/2012 | Hjelm et al. |
| 2012/0292945 A1 | 11/2012 | Hashimoto et al. |
| 2013/0076063 A1 | 3/2013 | Ryan et al. |
| 2013/0076064 A1 | 3/2013 | Smith et al. |
| 2013/0106136 A1 | 5/2013 | Smith et al. |
| 2013/0175824 A1 | 7/2013 | Smith et al. |
| 2013/0214557 A1 | 8/2013 | Smith et al. |
| 2014/0019010 A1 | 1/2014 | Smith et al. |
| 2014/0117713 A1 | 5/2014 | Baker |
| 2014/0339854 A1 | 11/2014 | Tuerk et al. |
| 2015/0035312 A1 * | 2/2015 | Grandominico ..... B62D 35/001 296/180.4 |
| 2015/0166129 A1 | 6/2015 | Camosy |
| 2015/0329152 A1 | 11/2015 | Baker et al. |
| 2016/0046333 A1 | 2/2016 | Baker |
| 2016/0152285 A1 | 6/2016 | Wiegel |
| 2016/0152286 A1 | 6/2016 | Meredith et al. |
| 2016/0185399 A1 | 6/2016 | Smith et al. |
| 2016/0185401 A1 | 6/2016 | Breidenbach |
| 2016/0200377 A1 | 7/2016 | Grandominico et al. |

FOREIGN PATENT DOCUMENTS

| | | |
|---|---|---|
| WO | WO/2013/188669 | 12/2013 |
| WO | WO/2016/045767 A1 | 3/2016 |

OTHER PUBLICATIONS

Photograph 2 of the Wabco OptiFlow device taken at IAA convention in Germany on Sep. 28, 2014.

(56) References Cited

OTHER PUBLICATIONS

Photograph 3 of the Wabco OptiFlow device taken at IAA convention in Germany on Sep. 28, 2014.
Photograph 4 of the Wabco OptiFlow device taken at IAA convention in Germany on Sep. 28, 2014.
Photograph 5 of the Wabco OptiFlow device taken at IAA convention in Germany on Sep. 28, 2014.
Photograph 6 of the Wabco OptiFlow device taken at IAA convention in Germany on Sep. 28, 2014.
Photograph 7 of the Wabco OptiFlow device taken at IAA convention in Germany on Sep. 28, 2014.
Photograph 8 of the Wabco OptiFlow device taken at IAA convention in Germany on Sep. 28, 2014.
Article at http://ir.wabco-auto.com published Sep. 23, 2014 "WABCO Debuts OptiFlow Tail at IAA Commercial Vehicles 2014; Latest Aerodynamic Product Enables Trailer Manufacturers and Fleets in Europe to Improve Fuel Economy and Operational Efficiency" (3 pages).
Office Action U.S. Appl. No. 145/141,409 dated May 1, 2017 (9 pages).
Aerodynamic Trailer Systems, LLC SmartTail® The Trucking Industry's First Totally Automated Trailer Air Spoiler from www.ats-green.com/smarttail.htm (2pages), Jan. 13, 2014.
Kodiak Innovations—"Bumper Bullet" from www.slipstreemaero.com (2 pages), Jan. 13, 2014.
Aerovolution—Revolutionary Inflatable Aerodynamic Solutions from www.aerovolution.com/information.shtml (2 pages), Oct. 13, 2014.
SmartTruck New Product Release: Low Profile Side Fairings Changing the Shape of Trucking, slide show for Mid-America Trucking Show, (7 pages), Mar. 21-23, 2013.
Trailer Fairings Be Road Smart from www.beroadsmart.com/Vortex_Generators-2.html (2 pages), Jan. 9, 2014.
Solus Aero Package from www.solusinc.com/aero.html (2 pages), Jan. 9, 2014.
Slipsteem Aerodynamics Homepage www.slipstreemaero.com (1 page).
Spoiler from www.ats-green.com/smarttail.htm (2 pages), May 8, 2015.
PCT /US2013/045661 International Search Report dated Nov. 14, 2013 (2 pages).
PCT/US2013/045661 Written Opinion of the International Searching Authority (dated Nov. 14, 2013 (5 pages).
PCT/US2013/045661 International Preliminary Report on Patentability dated Nov. 14, 2013 (6 pages).
U.S. Office Action on U.S. Appl. No. 14/928,056 dated Jan. 27, 2016 (10 pages).
U.S. Office Action on U.S. Appl. No. 14/407,674 dated Feb. 17, 2016 (10 pages).
Office Action U.S. Appl. No. 14/049,506 dated Jul. 1, 2014 (9 pages).
Office Action U.S. Appl. No. 14/049,506 dated Feb. 24, 2015 (10 pages).
Office Action U.S. Appl. No. 14/709,980 dated Jun. 16, 2016 (12 pages).
Office Action U.S. Appl. No. 14/928,056 dated Jul. 5, 2016 (9 pages).
EP 13803764 Supplementary European Search Report and Written Opinion of the Supplementary European Search Report, dated Jan. 26, 2016 (6 pages).

\* cited by examiner

AERODYNAMIC REAR DRAG REDUCTION SYSTEM FOR A TRAILER

This application claims priority under 35 U.S.C. § 119(e) to U.S. Provisional Patent Application Ser. No. 62/116,891 filed Feb. 16, 2015 entitled AERODYNAMIC REAR DRAG REDUCTION SYSTEM FOR A TRAILER, the entirety of which is hereby incorporated by reference herein.

This application cross-references U.S. Pat. No. 9,199,673 issued Dec. 1, 2015 and titled AERODYNAMIC REAR DRAG REDUCTION SYSTEM FOR A TRAILER; U.S. application Ser. No. 14/928,056 filed Oct. 30, 2015 and titled AERODYNAMIC REAR DRAG REDUCTION SYSTEM FOR A TRAILER; U.S. application Ser. No. 14/709,980 filed May 12, 2015 and titled AERODYNAMIC REAR DRAG REDUCTION SYSTEM FOR A TRAILER; U.S. application Ser. No. 14/407,674 filed Dec. 12, 2014 and titled WAKE CONVERGENCE DEVICE FOR A VEHICLE; and U.S. Provisional Patent Application Ser. No. 62/154,495 filed Apr. 29, 2015 and titled AERODYNAMIC REAR FAIRING SYSTEM FOR A TRAILER, the entirety of each of which is incorporated by reference herein.

FIELD OF THE INVENTION

The present invention relates generally to an aerodynamic rear fairing or drag reduction system for reducing drag on a vehicle such as a van-type trailer or truck body, for example.

BACKGROUND

To reduce wind flow resistance and drag on a trailer, truck, semitrailer, or other vehicle, side skirts which extend downwardly from a bottom of the trailer and/or chassis toward the roadway to partially enclose the floor assembly and undercarriage of the trailer, fairings and other such structures have been used. Many structures associated with the rear of the trailer are provided in order to also reduce the aerodynamic drag on the trailer.

A typical storage container of a trailer terminates with a large, rectangular rear surface. This shape causes an area of reduced pressure to be created behind the trailer storage container as it moves over the highway, thus generating a slowing force that must be overcome with additional engine power and thus additional fuel. In other words, turbulent air flow passing behind the vehicle imparts a drag force to the vehicle. Rear trailer fairings are designed to streamline the rear end of the trailer in order to control the flow of air at the rear of the vehicle. Such reduction on the drag of the ground vehicle may operate to conserve fossil fuels as well as other sources of vehicle drive power for hybrid vehicles, battery-operated vehicles, and alternative fuel-based vehicles, for example. However, many such fairings which extend from the rear end of the trailer also may cover the rear doors of the trailer which must be opened and closed by a user to load and unload the cargo within the storage area of the trailer in such a way that users may be required to dismount and mount, or otherwise manually operate, the fairing(s) each time a loading or unloading operation is to be performed.

SUMMARY

The present invention may comprise one or more of the features recited in the attached claims, and/or one or more of the following features and combinations thereof.

According to one aspect of the present disclosure, an aerodynamic rear drag reduction system configured to be coupled to a rear frame assembly of a trailer including a rear frame and the rear swing door is provided. The rear drag reduction system includes a top panel configured to be coupled to a top portion of a rear swing door of the trailer to extend generally horizontally along a top portion of a rear frame assembly of the trailer. The rear drag reduction system further includes a folding mechanism coupled to the top panel to move the top panel between (i) a fully-deployed position wherein the top panel is configured to extend generally rearwardly away from the rear end of the trailer and (ii) a fully-folded position wherein a bottom surface of at least a portion of the top panel is configured to lie generally adjacent the rear swing door of the trailer. The folding mechanism is configured to be coupled to a door locking mechanism of the trailer, and wherein the folding mechanism is automatically actuated as a result of movement of the door locking mechanism.

In one illustrative embodiment, movement of a handle of the door locking mechanism from a locked position to an unlocked position may automatically move the top panel from the fully-deployed position to the fully-folded position. In particular, movement of the handle of the door locking mechanism from the unlocked position to the locked position automatically may move the top panel from the fully-folded position to the fully-deployed position.

In another illustrative embodiment, the folding mechanism may be configured to be coupled to a lock-rod of the door locking mechanism. Further, rotational movement of the lock-rod may automatically actuate the folding mechanism.

In yet another illustrative embodiment, the folding mechanism may include (i) a linkage assembly configured to be coupled to a vertical lock-rod of a door locking mechanism, (ii) a vertically-extending deployment rod coupled to the linkage assembly of the trailer, and (ii) a support arm coupled to the deployment rod, wherein the top panel is supported by the support arm when the top panel is in the fully-deployed position. Illustratively, rotation of the vertical lock-rod may move the linkage assembly linearly, and wherein linear movement of the linkage assembly may rotate the deployment rod. Further illustratively, the support arm may be rigidly coupled to the deployment rod at a first end. The support arm may be movable between an extended position wherein the support arm extends rearwardly from the trailer to support the top panel thereon, and a stowed position wherein a distal end of the support arm is configured to be positioned generally adjacent the rear swing door of the trailer. In one embodiment, rotation of the deployment rod may cause the support arm to move between the extended position and the stowed position. Illustratively, a roller may be coupled to the distal end of the support arm.

In one embodiment, linkage assembly may include a manual release mechanism configured to be moved from (i) a locked position wherein the linkage assembly is configured to translate rotational movement of the lock-rod to rotational movement of the deployment rod to (ii) an unlocked position wherein the linkage assembly is not configured to translate rotational movement of the lock-rod to rotational movement of the deployment rod. Illustratively, the linkage assembly may include a first link coupled to the deployment rod, a second link coupled to the first link and configured to be coupled to the lock-rod of the door locking mechanism, and a manual release mechanism coupled to the first and second links, wherein the manual release mechanism is movable between a locked position wherein the first and second links are not movable relative to each other and an unlocked position wherein the first and second links are configured to move relative to each other.

According to another aspect of the present disclosure, an aerodynamic rear drag reduction system configured to be coupled to a rear frame assembly of a trailer including a rear frame and a rear swing door includes a top panel configured to be pivotably coupled to a top portion of the rear swing door of the trailer to extend generally horizontally along a top portion of the rear frame assembly of the trailer. Illustratively, the top panel is movable between a fully-deployed position wherein the top panel is configured to extend generally rearwardly away from the rear end of the trailer and a fully-folded position wherein a bottom surface of at least a portion of the top panel is configured to lie generally adjacent the rear swing door of the trailer. Further, the top panel includes an upper portion having a forward edge positioned above a top edge of the rear swing door and generally aligned with a top edge of the rear frame assembly of the trailer and a lower portion having a forward edge positioned generally above the top edge of the rear swing door and generally below the top edge of the rear frame assembly of the trailer.

In one illustrative embodiment, the upper portion and the lower portion may generally be parallel to each other.

In another illustrative embodiment, the forward edge of the lower portion may be configured to be positioned below rear upper identification lights of the trailer.

In still another illustrative embodiment, the top panel may also include a step coupled to and positioned between each of the upper and lower portions. Illustratively, the step may extend diagonally outwardly from a forward edge of the top panel to a rearward edge of the top panel.

In yet another illustrative embodiment, the upper portion may be separate from and supported by the lower portion when the top panel is in the fully-deployed position.

In still another illustrative embodiment, the top panel may be configured to pivot between the fully-deployed position and the fully-folded positions about a pivot axis. Further, the pivot axis may be angled relative to the top edge of the rear frame assembly. Illustratively, the pivot axis may be angled toward a rearward edge of the top panel as the pivot axis extends from the outer edge to the inner edge of the top panel.

According to yet another aspect of the present disclosure, a method of operating a top panel of an aerodynamic rear drag reduction system configured to be coupled to a rear frame assembly of a trailer including a rear frame and a rear swing door includes automatically moving the top panel between a fully-deployed position wherein the top panel is configured to extend generally rearwardly away from the rear end of the trailer and a fully-folded position wherein the top panel is configured to lie generally adjacent the rear portion of the trailer when a door locking mechanism of the trailer is moved from a locked position to an unlocked position.

BRIEF DESCRIPTION OF THE DRAWINGS

FIGS. 5A-8 are rear perspective views of one of the drag reduction systems of FIGS. 1-4 showing the top panel moving from a fully-deployed position to a fully-folded position by rotational movement of a lock-rod of a door locking mechanism of the trailer.

FIG. 5A shows the top panel in the fully-deployed position.

FIG. 6 shows the lock-rod of the door locking mechanism of the trailer having been rotated in the counterclockwise direction toward an unlocked position (in order to allow a user to unlock the rear swing doors of the trailer) to similarly cause counterclockwise rotation of a vertical deployment rod that is coupled via a linkage assembly to the lock-rod in order to rotate the support arm supporting the top panel approximately 100 degrees from an first, rearwardly-extending position engaged with and supporting the top panel to a second, stowed or out-of-the-way position to allow the top panel to move to the fully-folded position.

FIG. 7 shows the top panel pivoting toward the fully-folded position as the support arm supporting the top panel continues to move toward its the second position due to continued counterclockwise rotation of the lock-rod.

FIG. 8 shows the top panel in the fully-folded position.

FIG. 9 is a rear perspective view of the trailer showing the top panel in the fully-folded position and showing the rear swing door of the trailer being moved toward a fully-opened position.

FIG. 10 is a rear perspective view of the trailer similar to FIG. 9 showing the rear swing door moved further toward the fully-opened position and showing the second linkage mechanisms coupling the side panel to the sidewall of the trailer beginning to pivot as the panel is moved toward its stowed position.

FIG. 11 is a rear perspective view of the trailer similar to FIGS. 9 and 10 showing the rear swing door moved still further toward the fully-opened position.

FIG. 12 is a side perspective view of the rear portion of the trailer of FIGS. 9-11 showing the side panel moving with the rear swing door as well as the first and second linkage mechanisms and beginning to rotate toward its stowed position.

FIG. 13 is a side perspective view of the rear portion of the trailer of FIGS. 9-12 showing the rear swing door in the fully-opened position and the rear drag reduction system in a fully-stowed position, and also showing (in phantom) the side panel having rotated approximately 180 degrees and located between the rear swing door and the sidewall of the trailer.

FIG. 16 is a perspective view showing a pull-tab of the manual release mechanism having been removed from within a slot of the second link.

FIG. 17 is a perspective view showing the second link moving to the right relative to the first link to rotate the deployment rod.

FIG. 18 is a perspective view showing the second link having moved all the way to the right relative to the first link in order to rotate the deployment rod and lower the top panel without having to rotate, or otherwise operate, the vertical lock-rod of the door locking mechanism.

FIG. 19 shows the top panel in the fully-deployed position.

FIG. 20 shows the rotation of the lock-rod actuating the bell-crank mechanism to allow the top panel to move toward the fully-folded position.

FIG. 21 shows the top panel in the fully-folded position.

DETAILED DESCRIPTION OF THE PREFERRED EMBODIMENT

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other vehicles generally, and more specifically to conventional flat-bed and/or box or van type trailers, examples of which include, but should not be limited to, straight truck bodies, small personal and/or commercial trailers and the like. Accordingly, those skilled in the art will appreciate that the present invention may be implemented in a number of different applications and embodiments and is not specifically limited in its application to the particular embodiments depicted herein.

Figure 1:
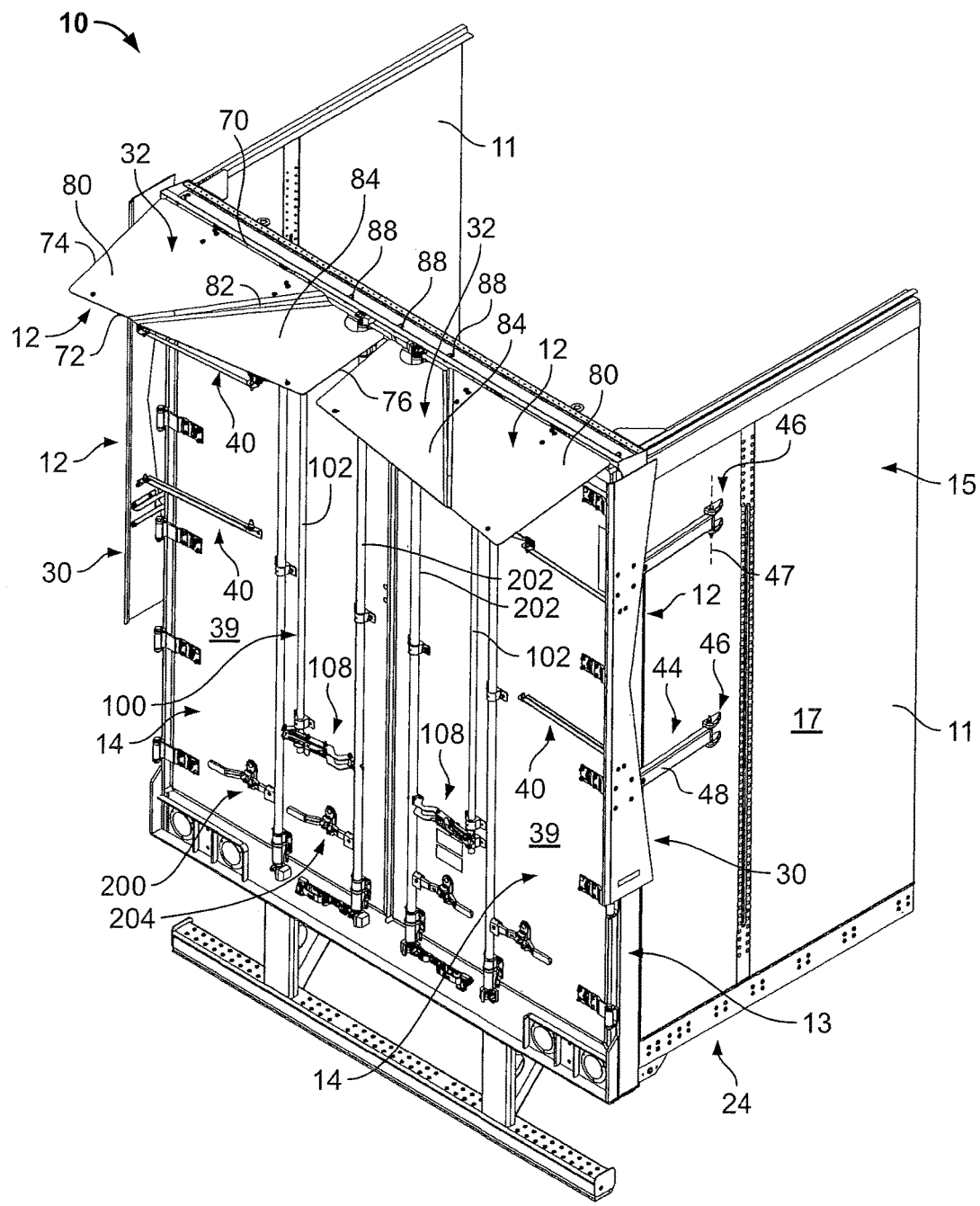
FIG. 1 is a rear perspective view of a rear end portion of a trailer showing a right and left aerodynamic rear drag reduction system of the present disclosure each in a fully-deployed position.

Looking first to FIG. 1, a trailer 10 includes an aerodynamic rear drag reduction system 12 coupled to the rear frame assembly (including a rear frame 13 and rear doors 14 coupled to the rear frame 13) of the trailer 10. Illustratively, the drag reduction system 12 operates to improve the aerodynamic efficiency of the trailer 10 by reducing drag and turbulent wind flow behind the rear end of the trailer 10. In particular, the drag reduction system 12 operates to reduce turbulent airflow immediately behind the trailer 10 as the trailer 10 is traveling down the road. The turbulent airflow immediately behind the rear end of the trailer 10 is reduced because the drag reduction system 12 channels and controls the flow of air from the sides and top of the trailer 10 over the rear end of the trailer 10. This reduction of turbulent airflow behind the trailer 10 may increase the fuel efficiency, or the efficiency of any other source of vehicle drive power, of the tractor/trailer combination.

Illustratively, the drag reduction system 12 extends behind the rear frame 13 and rear doors 14 of the trailer 10. As is further discussed in additional detail below, the drag reduction system 12 is movable with the rear doors 14 of the trailer 10 between a fully-deployed, or use, position (shown in FIG. 1), and a fully-closed, or stowed position (shown in FIG. 13). As shown in FIG. 1, the trailer 10 includes a storage container 15 configured to carry cargo therein. The storage container 15 includes sidewalls 11, a front end wall (not shown), the rear frame assembly (including the rear frame 13 and doors 14), a roof (not shown), and a floor assembly 24 which all cooperate together to define an inside storage portion of the container 15 that is able to store various articles or goods therein. The front end of the trailer 10 is configured to be coupled to a tractor (not shown) for towing the trailer 10 thereon, thus providing a tractor-trailer assembly. It should be understood that while the aerodynamic drag reduction system 12 is shown for use with a trailer 10, the drag reduction system 12 may be coupled to any vehicle or storage container to reduce the drag thereon.

Illustratively, the trailer 10 includes two drag reduction systems 12, as shown in FIG. 1. In particular, one system 12 is coupled to one rear swing door 14 of the trailer 10, while the other system 12 is coupled to the other rear swing door 14 of the trailer 10. For the purposes of the description herein, however, only the left drag reduction system 12 will be described herein. However, it should be understood that the two drag reduction systems 12 of the trailer 10 are identical in configuration and function.

As shown in FIGS. 1-13, the drag reduction system 12 includes a side panel 30 and a top panel 32. As shown in FIG. 1 and discussed in greater detail below, the side panel 30 is generally vertically-oriented and is hingedly coupled to both the left rear swing door 14 and the left sidewall 11 of the trailer 10. The top panel 32 is generally horizontally-oriented and is hingedly coupled to a top end of the left rear swing door 14. The side panel 30 and top panel 32 are spaced-apart from each other and are not engaged with each other when the rear drag reduction system 12 is in the fully-deployed position shown in FIG. 1. As is discussed in greater detail below, the drag reduction system 12 is configured to automatically move from the fully-deployed position shown in FIG. 1 to the fully-stowed position shown in FIG. 13 when a user unlocks a door locking mechanism 200 of the trailer 10 and moves the rear swing door 14 to its fully-opened position. In particular, the top panel 32 is configured to automatically move from the fully-deployed position to a fully-folded position (shown in FIG. 8) when a user unlocks the door locking mechanism 200, and the side panel 30 and fully-folded top panel 32 are then automatically moved to the fully-stowed position when the user fully opens the rear swing door 14. Further, the drag reduction system 12 is configured to automatically move from the fully-stowed position shown in FIG. 13 to the fully-deployed position shown in FIG. 1 when the user closes the rear swing door 14 and engages, or locks, the door locking mechanism 200 associated with the trailer 10. As is further discussed herein, the rear drag reduction system 12 includes a manual override mechanism 139 which allows a user to manually move the top panel 32 of the rear drag reduction system 12 from its fully-deployed position to its fully-folded position without unlocking or otherwise manipulating the door locking mechanism 200 of the trailer 10.

Figure 3A:
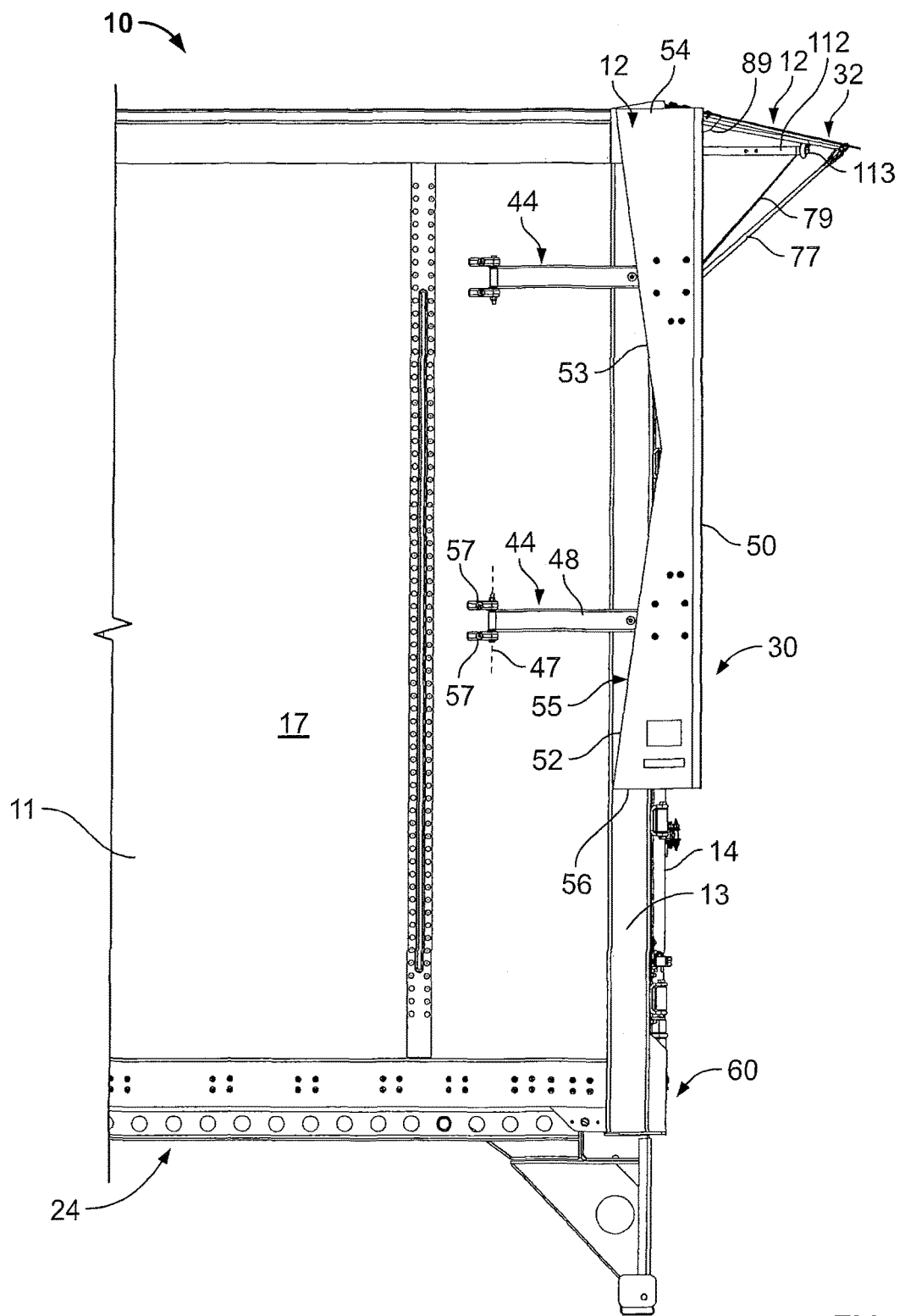
FIG. 3A is a side view of one of the drag reduction systems of FIGS. 1, 2A, and 2B showing the side panel pivotably coupled to the sidewall of the trailer.

As shown in FIG. 3A, the side panel 30 extends along a height of the trailer 10. Illustratively, a height of the side panel 30 is approximately two-thirds of a height of the rear frame 13 of the trailer 10 and is positioned such that a top edge of the side panel 30 is generally coplanar with a top surface of the roof assembly of the trailer 10. It should be understood, however, that the side panel 30 may be any suitable height greater than, equal to, or less than a height of the rear frame 13 and may be located at any position along a height of the rear frame 13 of the trailer 10.

The side panel 30 includes a rearward edge 50, a forward edge 52, a top edge 54, and a bottom edge 56. The top and bottom edges 54, 56 are generally horizontal and the rearward edge 50 is generally vertical. The forward edge 52 includes an angled upper portion 53 and an angled lower portion 55 to generally define a V-shaped profile of side forward edge 52. The upper portion 53 extends rearwardly from a top end to a bottom end thereof while the lower portion 55 extends forward from a top end to a bottom end thereof. Thus, a width of the side panel 30 is greater at top and bottom ends of the side panel 30 and is narrower at a middle of the side panel 30, as shown in FIG. 3. Illustratively, the rearward edge 50 is located rearward of the rear end 60 of the trailer 10. The top-most and bottom-most portions of the forward edge 52 of the side panel 30 are located forward of the rear end 60 of the trailer 10. However, the middle portion of the forward edge 52 of the side panel 30 is positioned rearward of the rear end 60 of the trailer 10 when the side panel 30 is in the fully-deployed position. As such, a portion of the side panel 30 is positioned forward of the rear edge 60 of the trailer 10 while a portion of the side panel 30 is positioned rearward of the rear edge 60 of the trailer 10 when the side panel 30 is in the fully-deployed position.

Figure 2A:
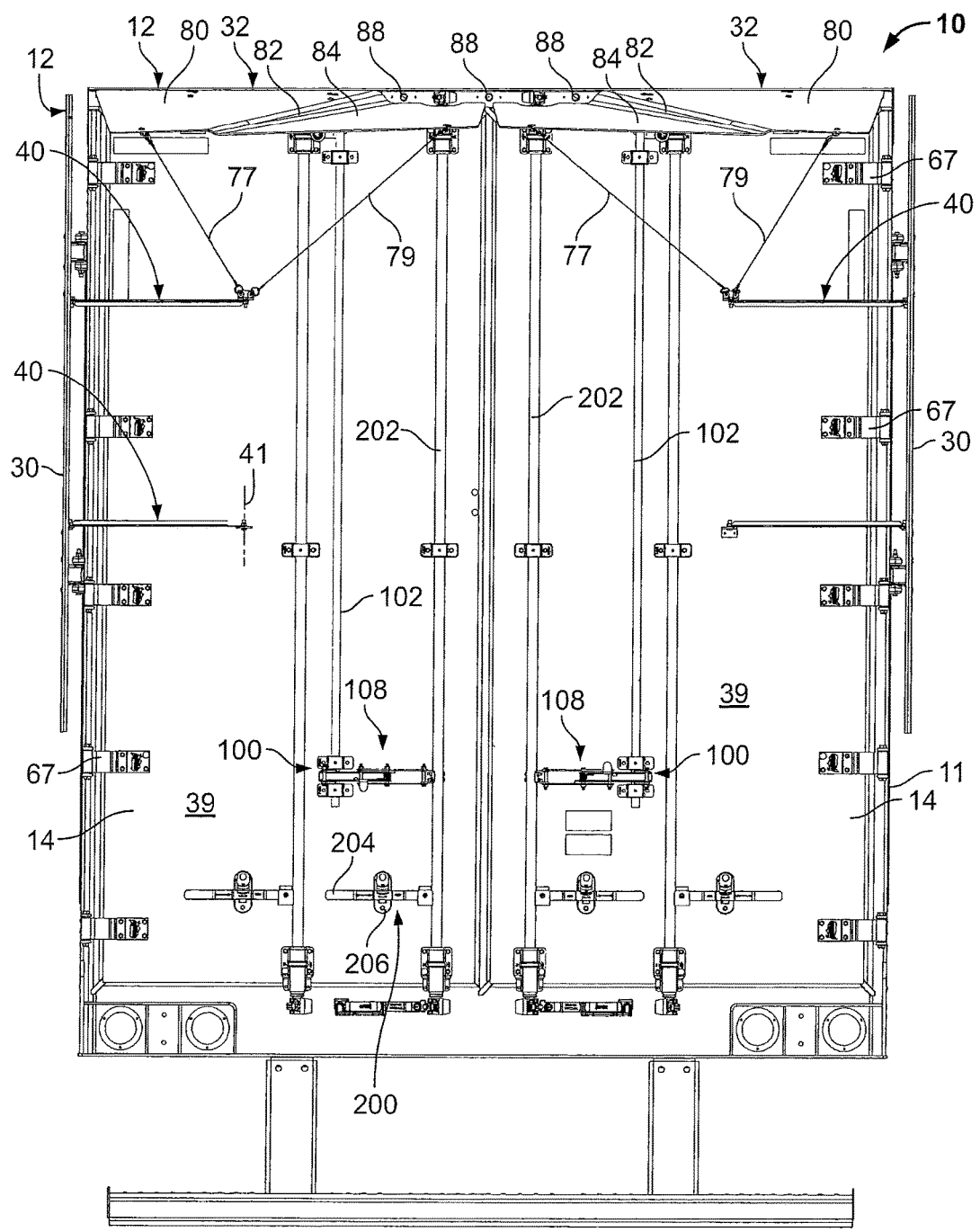
FIG. 2A is a rear view of the drag reduction systems of FIG. 1, each including a side panel and a top panel coupled to the rear swing door of the trailer for movement therewith.
Figure 2B:
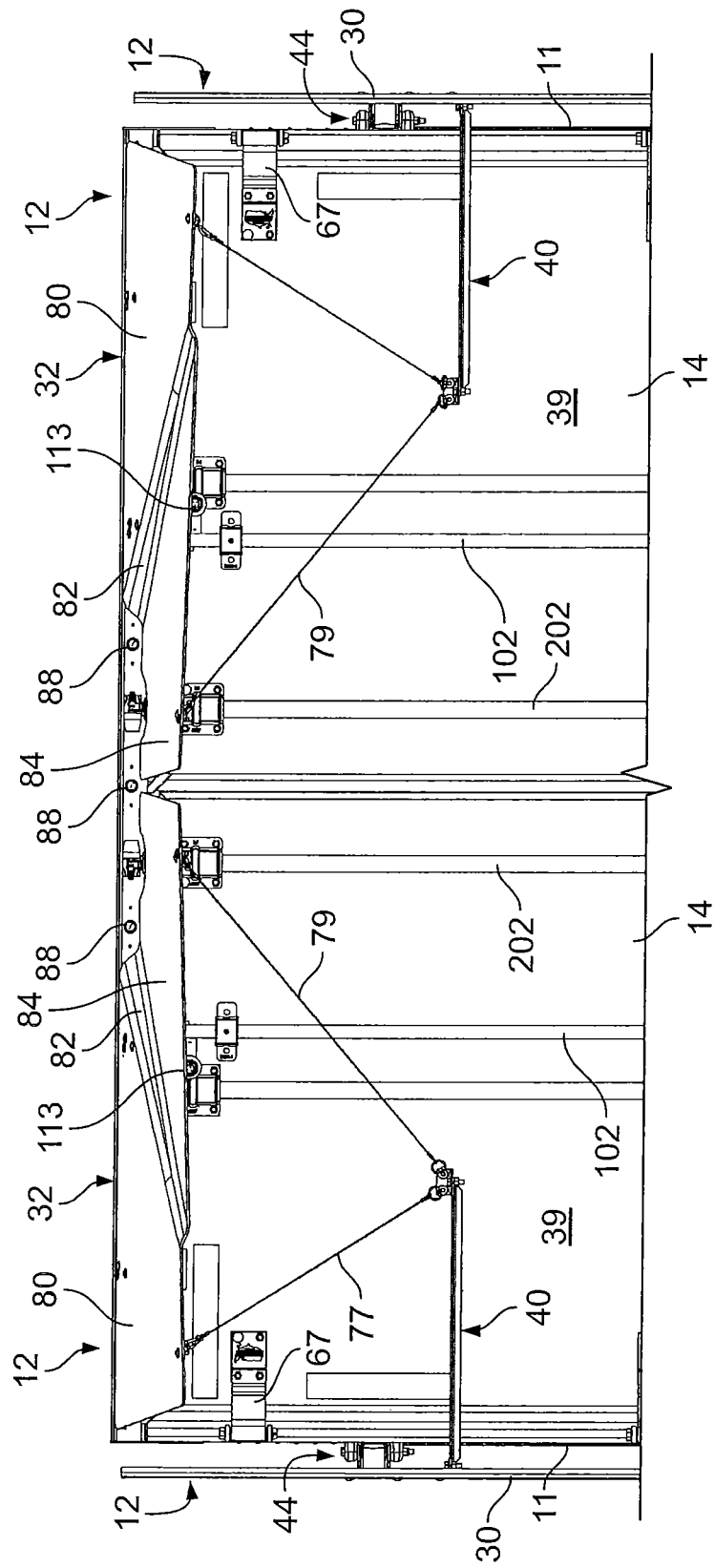
FIG. 2B is an enlarged, rear view of the top panel and upper portion of the side panels of each drag reduction system shown in FIGS. 1 and 2A.

The side panel 30 is spaced-apart from the sidewall 11 of the trailer 10 when the side panel 30 is in the fully-deployed position, as shown in FIG. 2B. Illustratively, the side panel 30 is spaced approximately up to two inches outwardly from the sidewall 11 of the trailer 10 when the side panel 30 is in the fully-deployed position. However, it should be understood that the side panel 30 may be located any suitable distance away from the sidewall 11. Further, it should be understood that the side panel 30 may be located at any suitable position along a length of the trailer 10 to locate the side panel 30 either fully forward or fully rearward of the rear end 60 of the trailer 10.

Figure 3B:
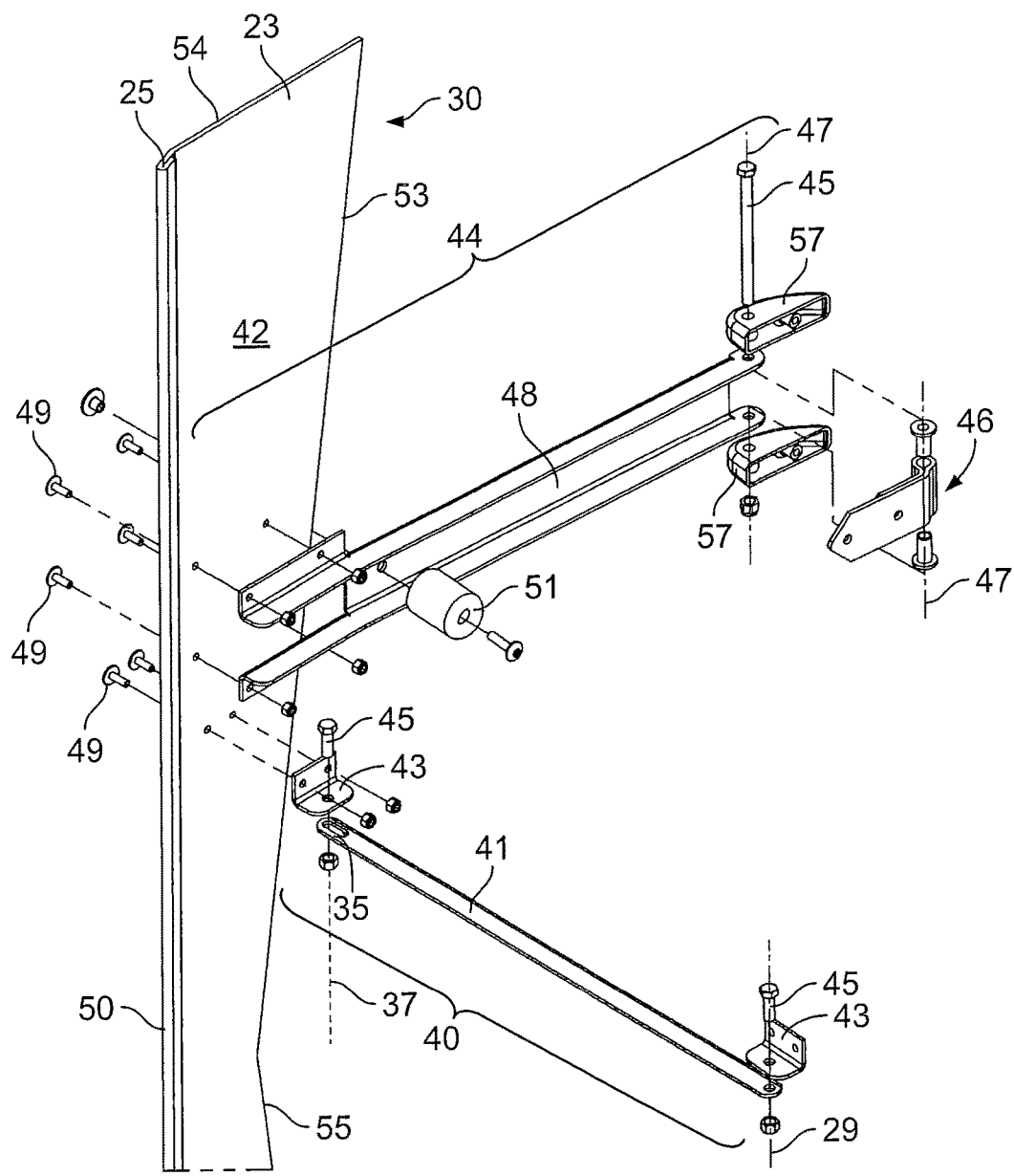
FIG. 3B is an exploded, perspective view of the side panel showing a first linkage mechanism for pivotably coupling the side panel to the rear swing door of the trailer and a second linkage mechanism for pivotably coupling the side panel to the sidewall of the trailer.

As shown in FIGS. 1, 2A, and 3B the side panel 30 of the drag reduction system 12 is coupled to the rear swing door 14 via two first linkage mechanisms 40. A first end of each first linkage mechanism 40 is pivotably coupled to an outer surface 39 of the rear swing door 14 while a second end of each first linkage mechanism 40 is pivotably coupled to an inside surface 42 of the side panel 30. Illustratively, as shown best in FIG. 3B, the first linkage mechanism 40 includes an elongated rod 41 configured to extend horizontally across a portion of the rear swing door 14 when the drag reduction system 12 is in the fully-deployed position, as shown in FIG. 1 for example. The first end of the rod 41 is pivotably coupled to the outside surface 39 of the rear swing door 14 by a bracket 43 and a pivot pin 45 defining a vertical axis 29 about which the rod 41 is able to pivot relative to the rear swing door 14. The second end of the rod 41 is similarly pivotably coupled to the inside surface 42 of the side panel 30 by another bracket 43 and pivot pin 45 defining a second vertical axis 37 about which the second end of the rod 41 is able to pivot relative to the side panel 30.

As shown in FIG. 3B, the second end of the rod 41 includes a slot 35 to receive the pivot pin 45 therethrough whereas the first end of the rod 41 includes an aperture to receive the corresponding pivot pin 45 therethrough. It should be understood that the slot 35 at the second end of the rod 41 is provided in order to accommodate manufacturing tolerances in order to allow for the components to be more easily installed and/or to allow for the components to better move relative to each other from the fully-deployed position to the fully-stowed position in order to fold close against the sidewall 11 of the trailer 10, for example. It should be understood that either a slot or aperture may be provided at each of the first and second ends of the rod 41. While the slot 35 is shown and disclosed herein, it should be understood that a resilient grommet may also be used in order to accommodate manufacturing tolerances. Thus, each of the first and second ends of the rod 41 of the first linkage mechanism 40 is pivotable about a respective vertical axis 29, 37 generally perpendicular to the orientation of the elongated rod 41 to allow the side panel 30 to automatically move toward its fully-stowed position as the rear swing door 14 is opened (as is discussed in greater detail below). Illustratively, while two first linkage mechanisms 40 are shown, it is within the scope of the disclosure for the drag reduction system 12 to include any suitable number of first linkage mechanisms 40.

The side panel 30 is also coupled to the adjacent sidewall 11 of the trailer 10 via two second linkage mechanisms 44, as shown in FIGS. 3A, 3B, and 9-12. Each second linkage mechanism 44 includes a bracket 46 coupled to the outer surface 17 of the sidewall 11 of the trailer 10. An arm 48 of each second linkage mechanism 44 is pivotably coupled at a first end thereof to the bracket 46 via a pivot pin 45 to define a vertical pivot axis 47. The second end of the arm 48 is rigidly coupled to the inside surface 42 of the side panel 30 via fasteners 49. A bumper 51, as shown in FIG. 3B, is coupled to an inner wall of the arm 48 near the second end thereof. The illustrative bumper 51 is made of rubber, but may be made of any suitable resilient, compressible, or pliable material. The rubber bumper 51 is generally cylindrical in shape and is provided to engage the outer surface 39 of the rear swing door 14 when the rear drag reduction system 12 is in its fully-deployed position. The rubber bumper 51 provides some cushion or dampening, as well as positioning of the components, when the side panel 30 is in the fully-deployed position. For example, the rubber bumper 51 may aide in setting the position and spacing of the side panel 30 relative to the sidewall 11 of the trailer 10 when the side panel 30 is in the fully-deployed position in order to prevent lateral movement of the side panel 30 along the slot 35 on the distal end of the rod 41 when the side panel 30 is in its fully-deployed position.

As shown in FIG. 3B, the second linkage mechanism 44 further includes a pair of caps 57 rigidly coupled to the sidewall 11 of the trailer 10 and pivotably coupled to the first end of the arm 48 via the pivot pin 45 defining the pivot axis 47. The smooth, tapered outer surface of these caps 57 may reduce any tendency of the second linkage mechanism 44 to catch or snag on an object as the trailer 10 travels down the highway with the side panel 30 in the fully-deployed position.

Figure 9:
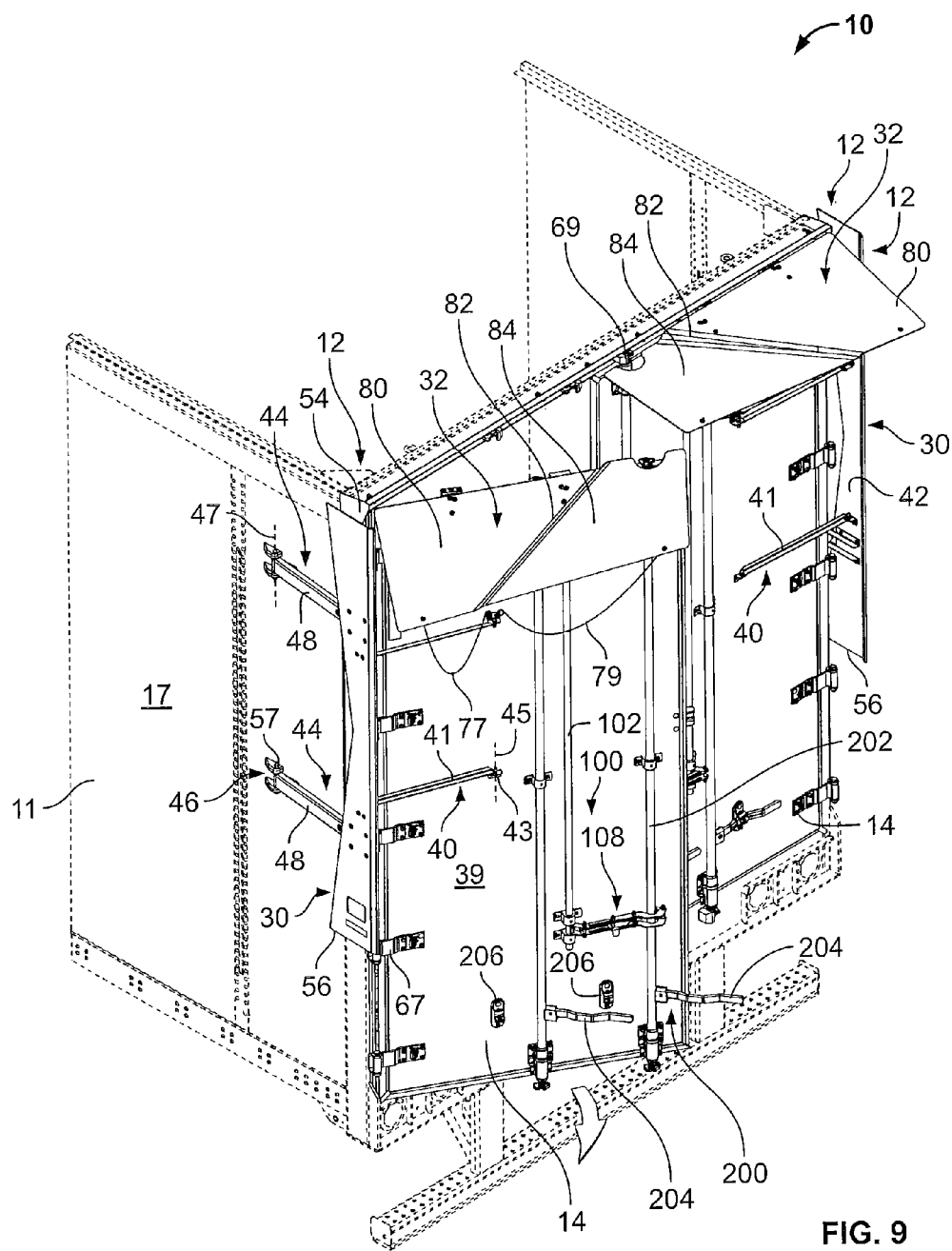
FIGS. 9-13 are rear and side perspective views of the drag reduction system of FIGS. 1-8 showing the top panel in the fully-folded position and showing further movement of one of the drag reduction systems to a fully-stowed position as the rear swing door of the trailer is moved toward a fully-opened position adjacent the sidewall of the trailer.
Figure 10:
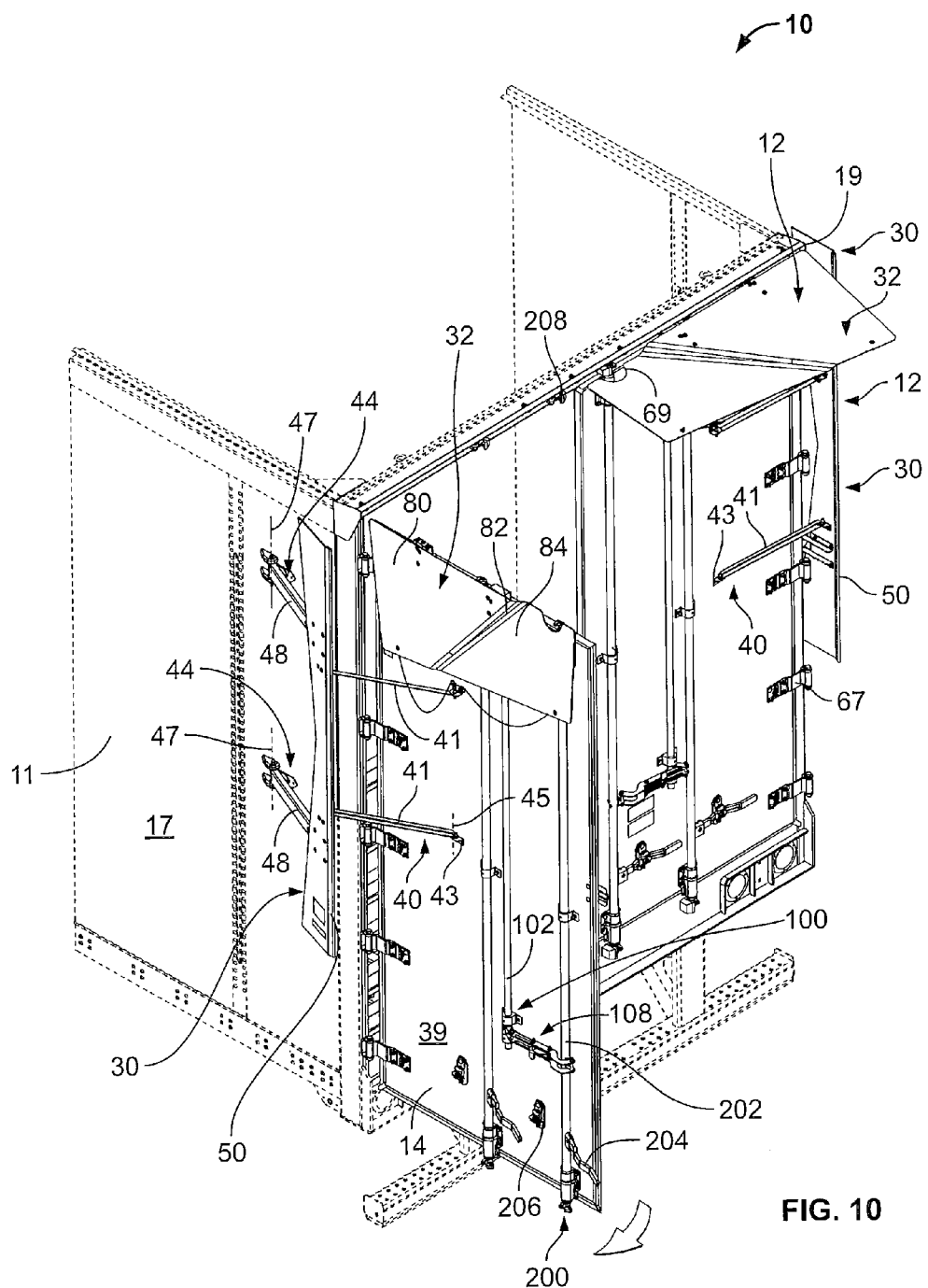
Figure 11:
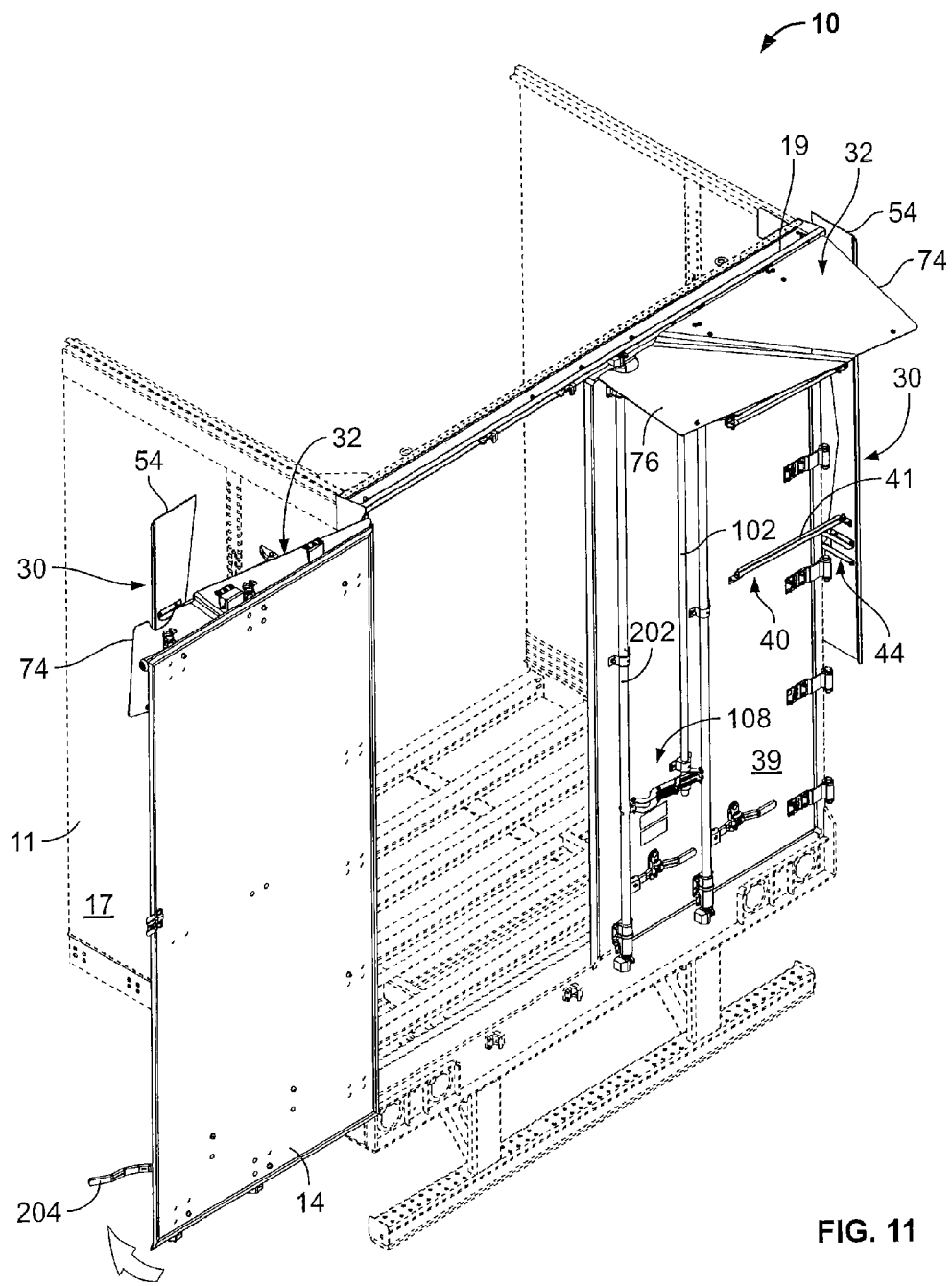
Figure 12:
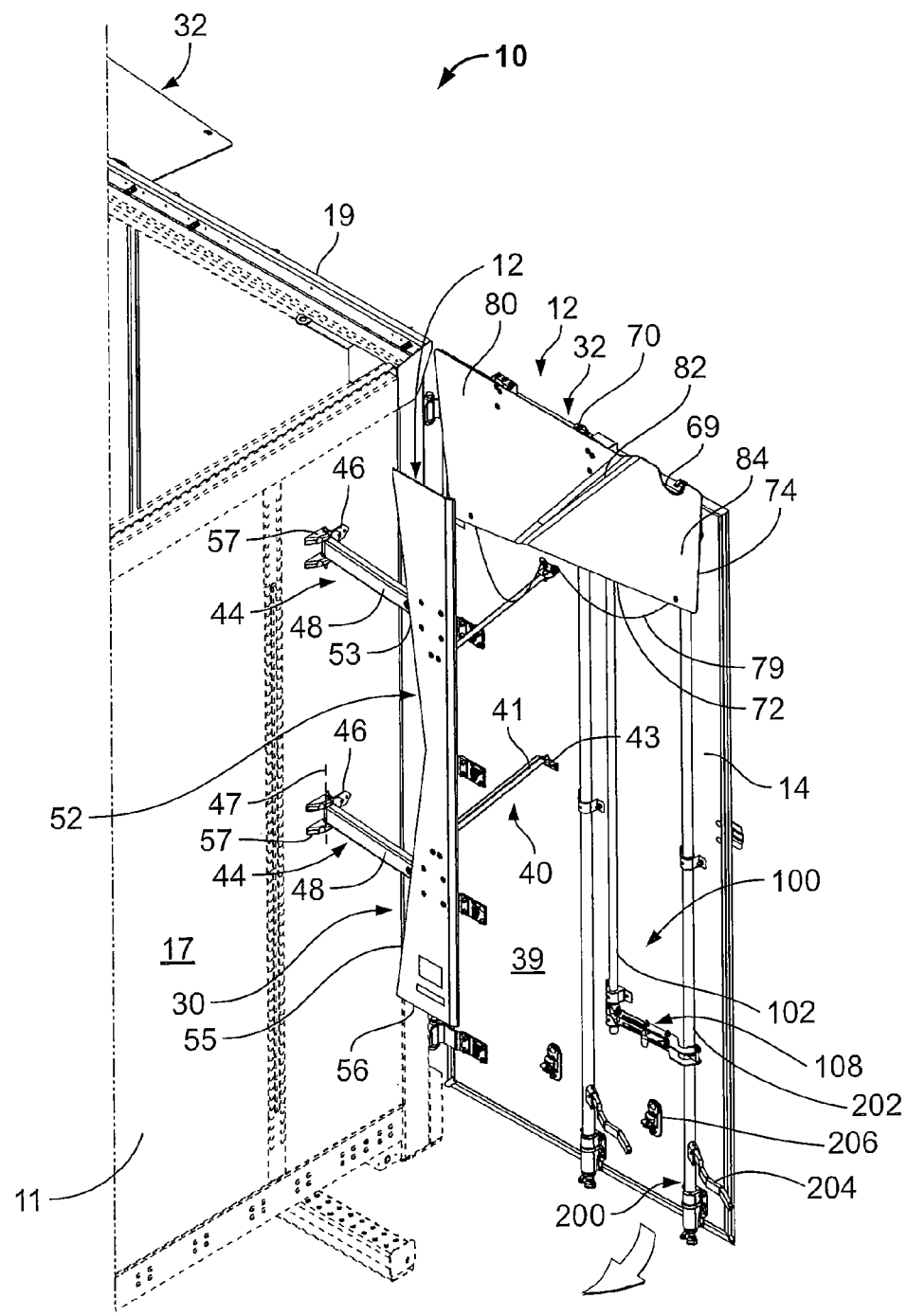

As shown in FIGS. 9, 10 and 12, the arm 48 of the second linkage mechanism 44 moves from a generally rearwardly-extending position (wherein the arm 48 extends rearwardly from the bracket 46) to a forwardly-extending position (wherein the arm 48 extends forwardly from the bracket 46) by pivoting approximately 180 degrees about the vertical axis 47 to move the side panel 30 to the fully-stowed position adjacent the outer surface 17 of the sidewall 11 of the trailer 10. Illustratively, while two second linkage mechanisms 44 are shown, it is within the scope of the disclosure for the drag reduction system 12 to include any number of second linkage mechanisms 44 coupling the side panel 30 to the sidewall 11 of the trailer 10. As is discussed in greater detail below, the second linkage mechanism 44 operates to assist in rotating, or flipping the side panel 30 approximately 180 degrees from its fully-deployed position shown in FIG. 1 to its fully-stowed position shown in phantom in FIG. 13 adjacent the sidewall 14 of the trailer 10. Illustratively, as shown in FIG. 3B, the rearward edge 50 of the side panel 30 is folded, or hemmed, in order to stiffen the panel 30 and reduce any potential flapping or wobbling of the side panel 30 as the trailer 10 travels down the highway.

Figure 4:
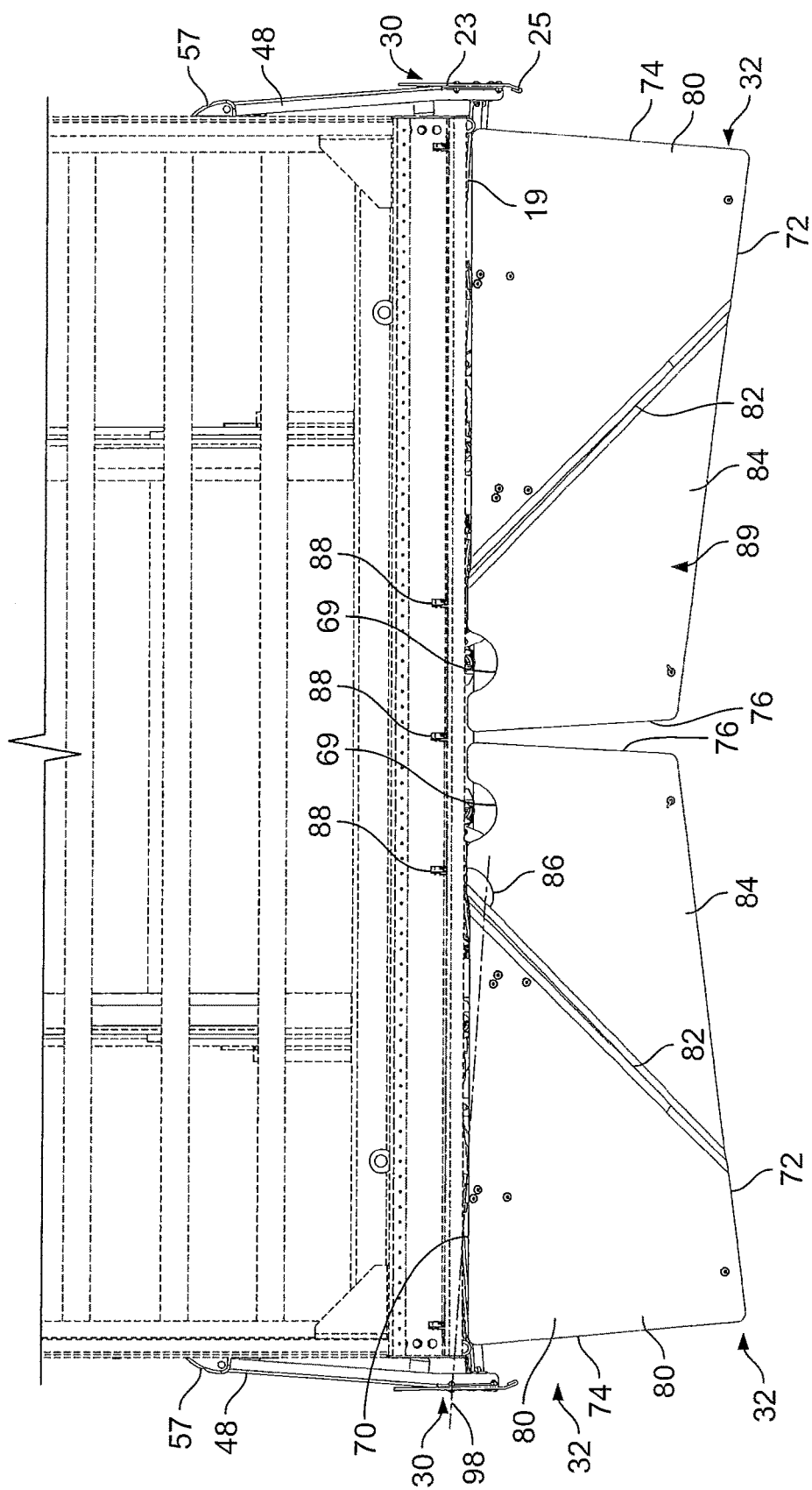
FIG. 4 is top view of the drag reduction systems of FIGS. 1-3B showing the top panels each including an upper/outer portion, a diagonal step, and a lower/inner portion, and showing the side panels spaced-apart from the sidewall of the trailer.

The side panel 30 further includes a bend along a vertical axis thereof resulting in two different planar surfaces 23, 25 as shown in FIGS. 3B and 4. Illustratively, the second planar surface 25 is angled inwardly approximately 20 degrees from the first planar surface 23 in order to direct the flow of air around and behind the trailer 10. It should be understood that while the illustrative side panel 30 includes the two planar surfaces 23, 25 angled approximately 20 degrees from each other, it is within the scope of this disclosure to provide a side panel having only a single planar surface as well as a side panel having two or more angled surfaces which are each positioned at any suitable angle relative to each other.

Looking now to FIGS. 1, 2B, and 4, the top panel 32 of the rear drag reduction system 12 extends generally horizontally along an upper, rear edge 19 of the rear frame 13. In particular, the top panel 32 extends along and above the horizontal top edge of the rear swing door 14 of the trailer 10. The top panel 32 is generally rectangular in shape and includes a forward edge 70, a rearward edge 72, an outer edge 74, and an inner edge 76 as shown in FIG. 4. Illustratively, the outer edge 74 is longer than the inner edge 76, and the forward edge 70 is longer than the rearward edge 72. Further illustratively, the inner and outer edges 74, 76 are not parallel to each other while the forward and rearward edges 70, 72 are also not parallel to each other.

As shown in FIG. 4, the forward edge 70 generally extends horizontally and is parallel to the upper edge 19 of the rear frame 13. The rearward edge 72, angles forwardly from the outside edge 74 toward the inside edge 76. As such, the inside edge 76 is shorter in length than the outside edge 74. Illustratively, the outside edge 74 angles slightly inwardly from the forward edge 70 to the rearward edge 72. Similarly, the inside edge 76 also angles slightly inwardly from the forward edge 70 to the rearward edge 72. Illustratively, the rearward edge 72 is angled approximately 7 degrees from a plane parallel to the rear swing door 14; the outer edge 74 is angled approximately 5 degrees and the side edge 76 is angled approximately 3 degrees from a plane perpendicular to the rear swing door 14. While the particular locations, lengths, and angles of the edges 70, 72, 74, 76 of the top panel 32 are shown and described herein, it should be understood that the edges 70, 72, 74, 76 may be oriented in any suitable manner to define the top panel 32.

As shown in FIGS. 1, 2A, and 2B, the top panel 32 includes an upper planar portion 80, a step 82, and a lower, or stepped-down, planar portion 84. The upper portion 80 defines a plane that is positioned above a plane defined by the lower portion 84 of the top panel 32. As shown in a plan view in FIG. 4, the step 82 extends somewhat diagonally at an angle across a width of the top portion 32 to define the two quadrilateral upper and lower portions 80, 84. In particular, the step 82 angles outwardly from the forward edge 70 to the rearward edge 72, such that the upper portion 80 also defines an outer portion of the top panel 32 and the lower portion 84 also defines an inner portion of the top panel 32. Illustratively, the step 82 does not define a vertical plane, but is angled as shown in FIGS. 1 and 4. As shown best in FIG. 4, the forward edge 70 of the lower portion 84 defines a curved cut-out 69. The curved cut-out 69 provides clearance for the upper portions of the door locking mechanism 200.

An angle 86 between the step 82 and the forward edge 70 of the lower portions 84 of the top panel 32 is approximately 135 degrees. As shown in FIG. 2B, the stepped-down portion 84 of the top panel 30 is positioned above the top edge of the rear swing door 14 and below the upper, center identification lights 88 of the trailer 10. As such, a driver traveling behind the trailer 10 of the present disclosure is able to see the identification lights 88 of the trailer 10 and the light emanated therefrom. Illustratively, the particular dimensions of the top panel 32 provide that a driver traveling behind the trailer 10 is able to see the identification lights 88 from a line of site approximately 10 degrees angled downwardly from the center, identification lights 88 and 45 degrees to the left and right of the lights 88. While such a driver may be unable to see the center, top identification lights 88 at close distances between the driver and the rear end of the trailer 10, the driver may then able to see the corner identification lights (not shown) located at the upper corners of the rear frame 13 of the trailer 10 when the rear drag reduction system 12 is in the fully-deployed position. These upper corner lights are positioned below the forward edge 72 of the upper portion 80 when the top panel 32 is in the fully-deployed position. As such, the two lower portions 84 of the adjacent top panels 32 create a viewable center ID light zone 89 defined by the angled steps 82 and the forward and rearward edges 70, 72 of the step-down portions 84 while also providing a top panel 82 having outer portions 80 with a forward edge 70 generally aligned with a top, rear edge 19 of the trailer 20 to maximize the aerodynamic effects of the top panel 32 on the trailer 10.

As shown best in FIGS. 1 and 3A, the entire top panel 32, including the upper portion 80, the step 82, and the lower portion 84, is angled downwardly from the forward edge 70 of the panel 32 to the rearward edge 72 of the panel 32. The forward edge 70 of the panel 32 is approximately located at the same height as the rear edge 19 top of the rear frame 13 of the trailer 10 while the rearward edge 72 of the top panel 32 is positioned at a location generally below the top edge 19 of the rear frame 13 of the trailer 10. Illustratively, the top panel 32 is angled downwardly approximately 12 degrees to define an acute angle 89 (shown in FIG. 3A) between the top panel 32 and the rear frame 13 of the trailer 10. Illustratively, both the upper portion 80 and the lower portion 84 of the top panel 32 are angled downwardly approximately the same 12 degrees. As such, the upper portion 80 and the lower portion 84 are generally parallel to each other. It should be understood, however, that the top panel 32 may define any suitable angle relative to the rear frame 13 of the trailer 10. Further, as is discussed below, the upper and lower panels 80, 84 may be angled relative to (and not parallel to) each other to define different angles relative to the vertical plane of the trailer 10.

Figure 5A:
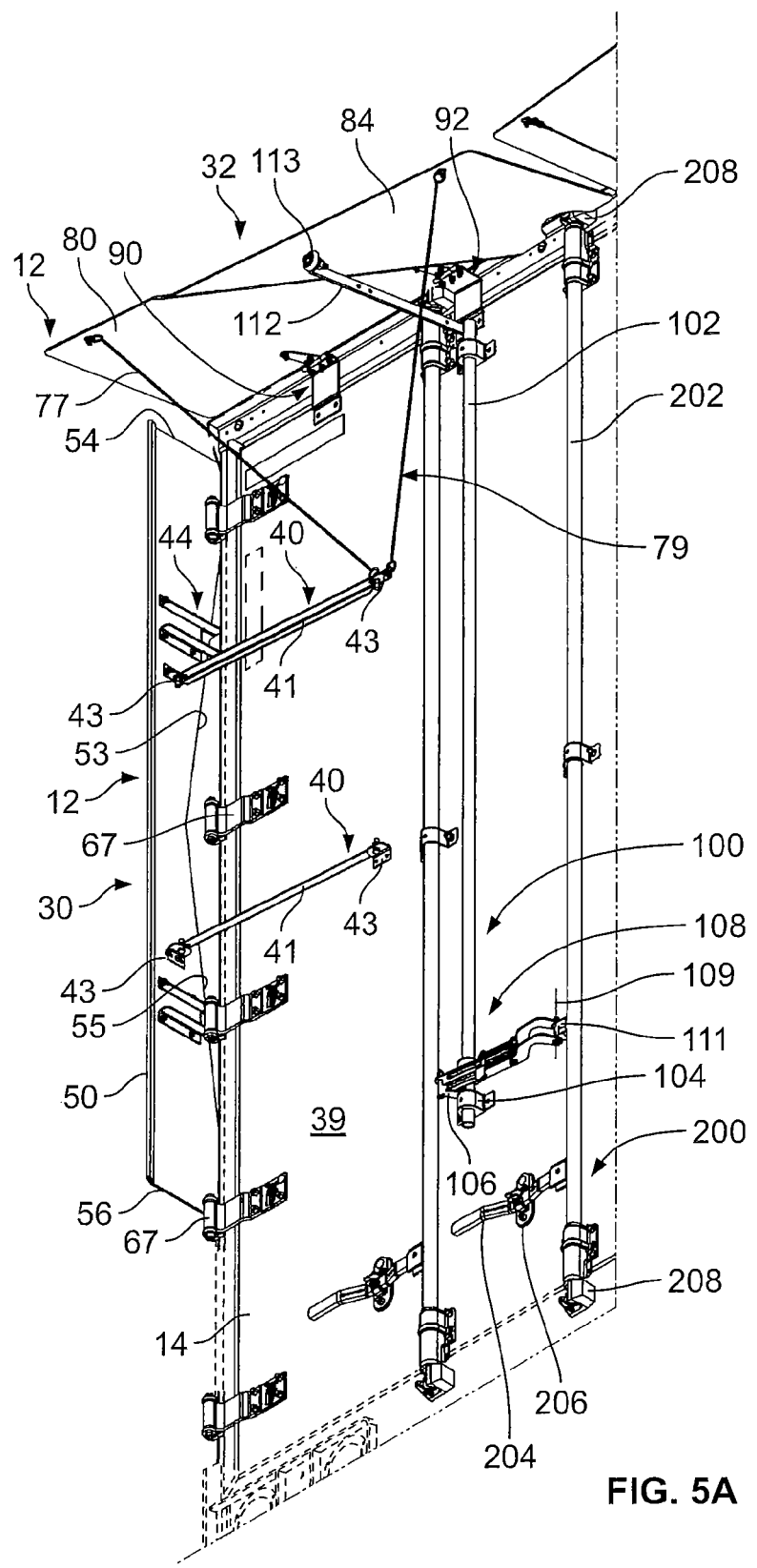
Figure 5B:
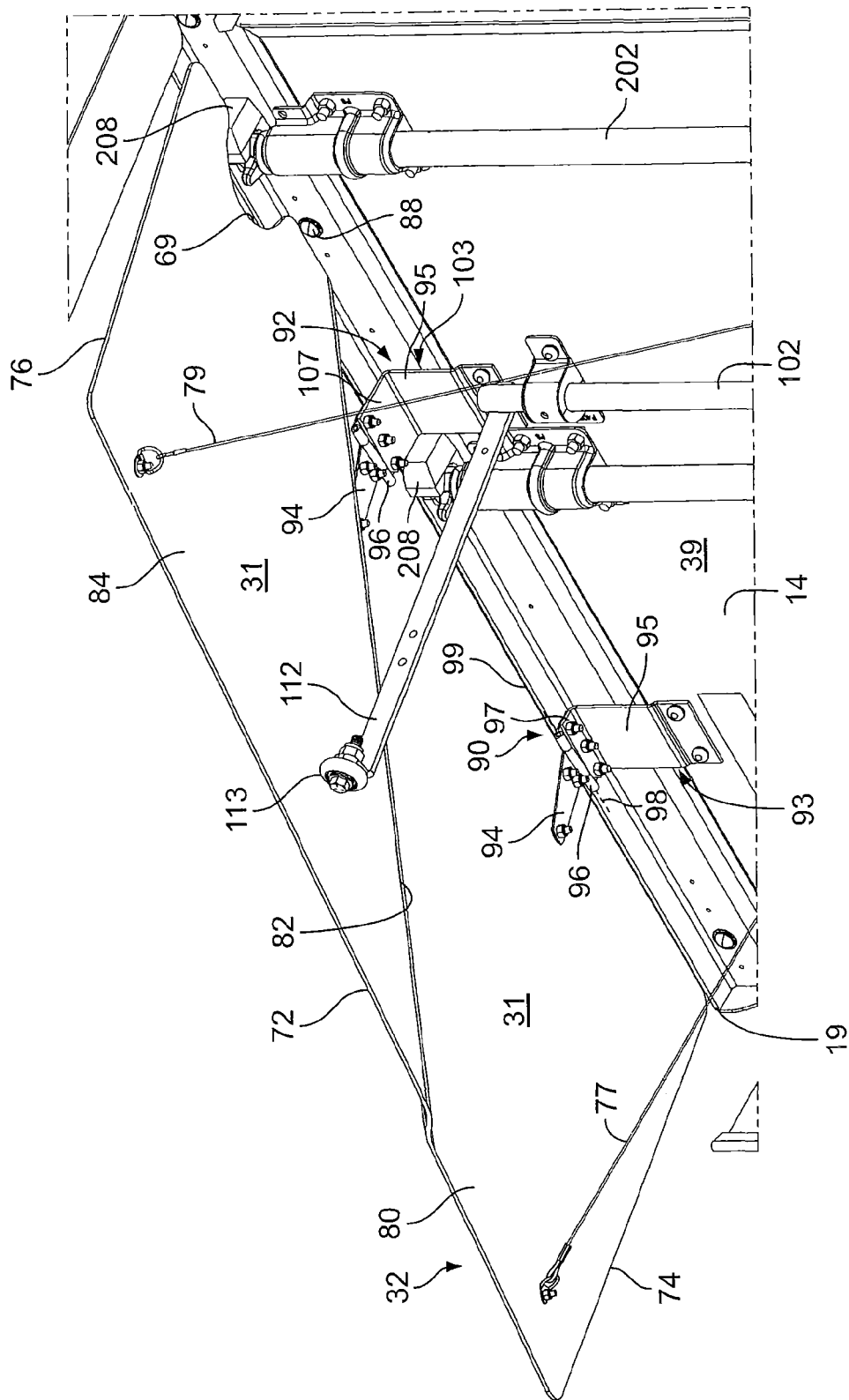
FIG. 5B is an enlarged, perspective view of the top panel in the fully-deployed position and a support arm supporting the top panel thereon.
Figure 6:
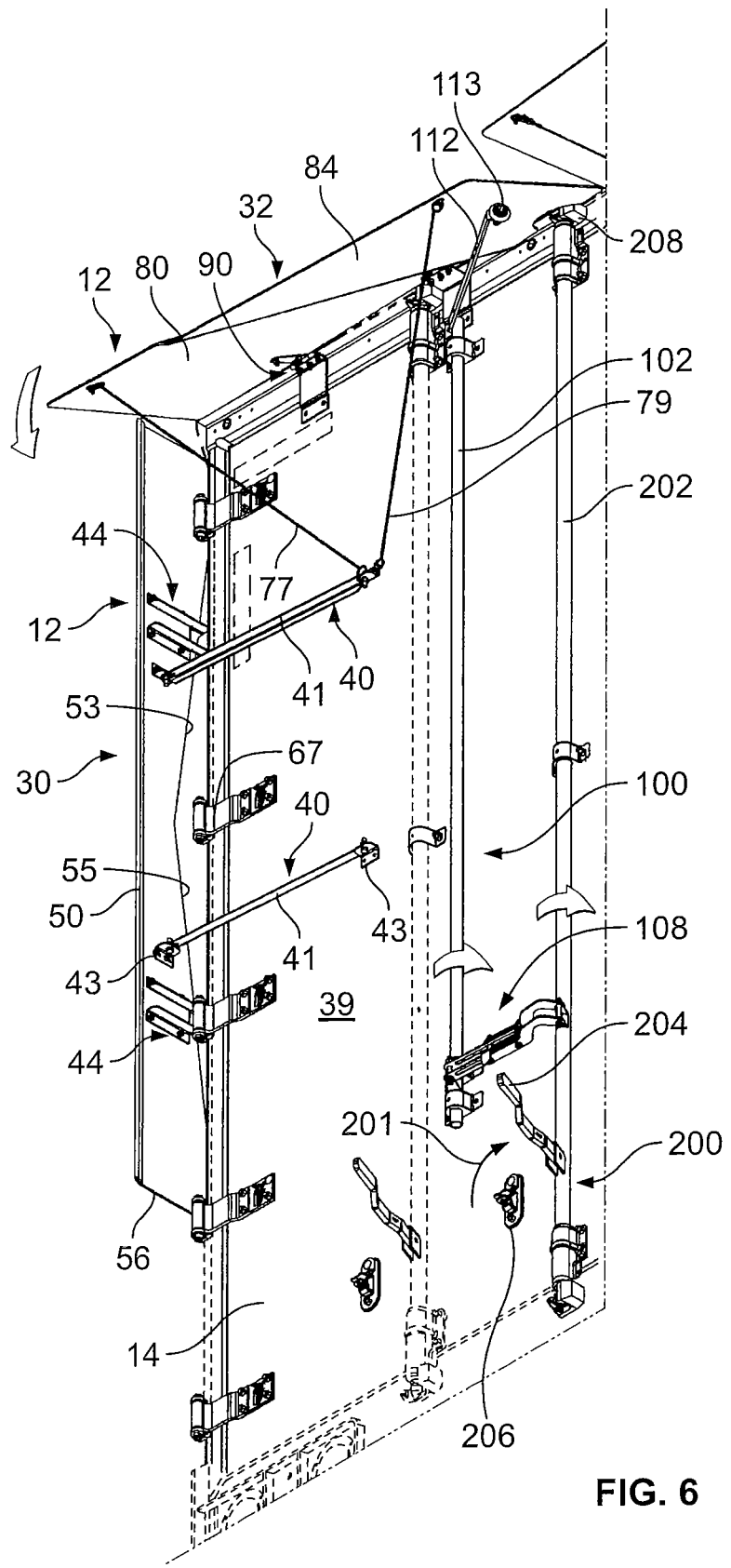
Figure 7:
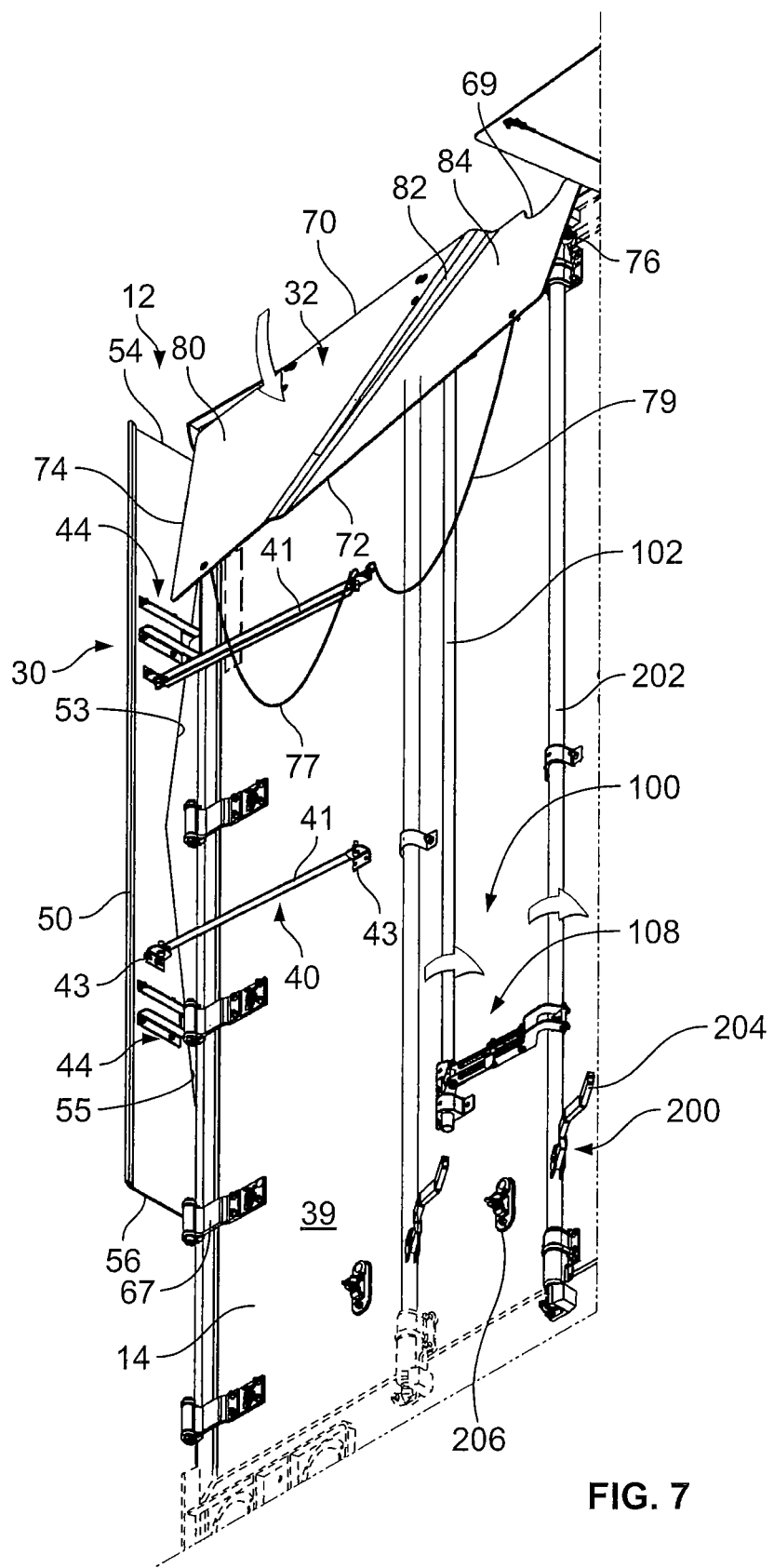

As shown in FIGS. 5A and 5B, the top panel 32 is pivotably coupled to the rear swing door 14 for movement relative to the rear swing door 14 between fully-deployed and fully-folded positions. First and second hinges 90, 92 of the rear drag reduction system 12 are coupled to the top panel 32 and the rear swing door 14 to allow the top panel 32 to pivot relative to the rear swing door 14. As shown in FIG. 5B, the first, outer hinge 90 includes an L-shaped hinge plate 93 having a vertically-extending portion 95 that is coupled to the outer surface 39 of the rear swing door 14 adjacent a top edge thereof, and a rearwardly-extending portion 97 coupled to a top end of the vertical portion 95 and extending generally perpendicularly to the portion 95. The hinge 90 further includes a hinge joint 96 coupled to the distal end of the rearwardly-extending portion 97 of the L-shaped hinge plate 93, and a hinge plate 94 coupled to both the hinge joint 96 and the bottom surface 31 of the upper portion 80 of the top panel 32. As shown in FIGS. 4 and 5B, the hinge joint 96 defines a pivot axis 98 therethrough. As is discussed below, the pivot axis 98 is not parallel to the upper rear edge 19 of the rear frame 13, but is offset (or angled) relatively thereto in order to allow for more compact folding of the rear drag reduction system 12 when in the fully-stowed position.

In particular, when the rear swing door 14 of the trailer 10 is in its fully-opened position adjacent the sidewall 11 of the trailer 10, the rear swing door 14 is not parallel to the sidewall 11 of the trailer 10. Rather, a generally "pie-shaped" space between the door 14 and the sidewall 11is created. It is in this pie-shaped space that the rear drag reduction system 12 is located when in its fully-stowed position. However, because the top panel 32 must fold over the lock-rods 202 of the door locking mechanism 200, the offset, or angled, hinge axis 98 operates to accommodate this structure to allow the rear drag reduction system 12 to be positioned within the pie-shaped space between the sidewall 11 of the trailer 10 and the rear swing door 14 in the fully-stowed position.

Similar to the first, outer hinge 90, the second, inner hinge 92 includes the hinge plate 94 coupled to the bottom surface 31 of the upper portion 80 of the top panel 32, the hinge joint 96, and an L-shaped hinge plate 103 including the vertical portion 95 and a larger rearwardly-extending (or horizontal) portion 107. Because the hinge joint 96 of each hinge 90, 92 is coupled to a rearward end of the respective horizontal portions 97, 107 of each L-shaped hinge plate 93, 103, and because the horizontal portion 107 of the second hinge 92 is larger (and extends farther rearwardly) than the horizontal portion 97 of the first hinge 90, the hinge joint 96 of the second hinge 92 is positioned farther rearwardly from the rear frame 13 of the trailer 10 than the hinge joint 96 of the first hinge 90. Similar to the first hinge 90, the second hinge 92 is positioned at a slight angle so that the hinge joints 96 of the first and second hinges 90, 92 are aligned to define the angled hinge axis 98. As shown best in FIG. 4, the hinge axis 98 defined by the first and second hinges 90, 92 is angled outwardly approximately 5 degrees from the rear frame 13 of the trailer 10 as measured from the outer edge 74 of the top panel 32 to the inner edge 76 of the top panel 32.

It should also be noted that the vertical portion 90 of each L-shaped hinge plate of the hinges 90, 92 extends upwardly above the top edge of the swing door 14 in order to generally align the upper portion 80 of the top panel 32 with the top rear edge 19 of the rear frame 13 of the trailer 10. As such, both the forward edge 70 of the upper and lower portions 80, 84 of the top panel 32 is positioned above the rear swing door 14 when the top panel 32 is in the fully-deployed position. Further, the forward edge 70 of the top panel 32 is positioned above the rear swing door 14 when the top panel 32 is in the fully-folded position.

Looking now to FIGS. 2A, 2B, and 5A, the rear drag reduction system 12 further includes a first cable 77 coupled at a first end to the bottom surface 31 of the upper portion 80 of the top panel 32, and coupled at a second end to the bracket 43 of the first linkage mechanism 40 that is coupled to the outer surface 39 of the rear swing door 14 of the trailer 10. A second cable 79 extends between, and is coupled to, the bottom surface 31 of the lower portion 84 of the top panel 32 and the same bracket 43 coupled to the rear swing door 14. Illustratively, a first end of each cable 77, 79 is coupled near a respective outer corner of the top panel 32 and operates to minimize or prevent any tendency for the top panel 32 to move upwardly when the rear drag reduction device is in the fully-deployed position and the trailer 10 is traveling down the highway. In other words, the cables 77, 79 operate to stabilize the top panel 32 when in the fully-deployed position. However, the cables 77, 79 do not operate to support the top panel 32 in its fully-deployed position.

Figure 8:
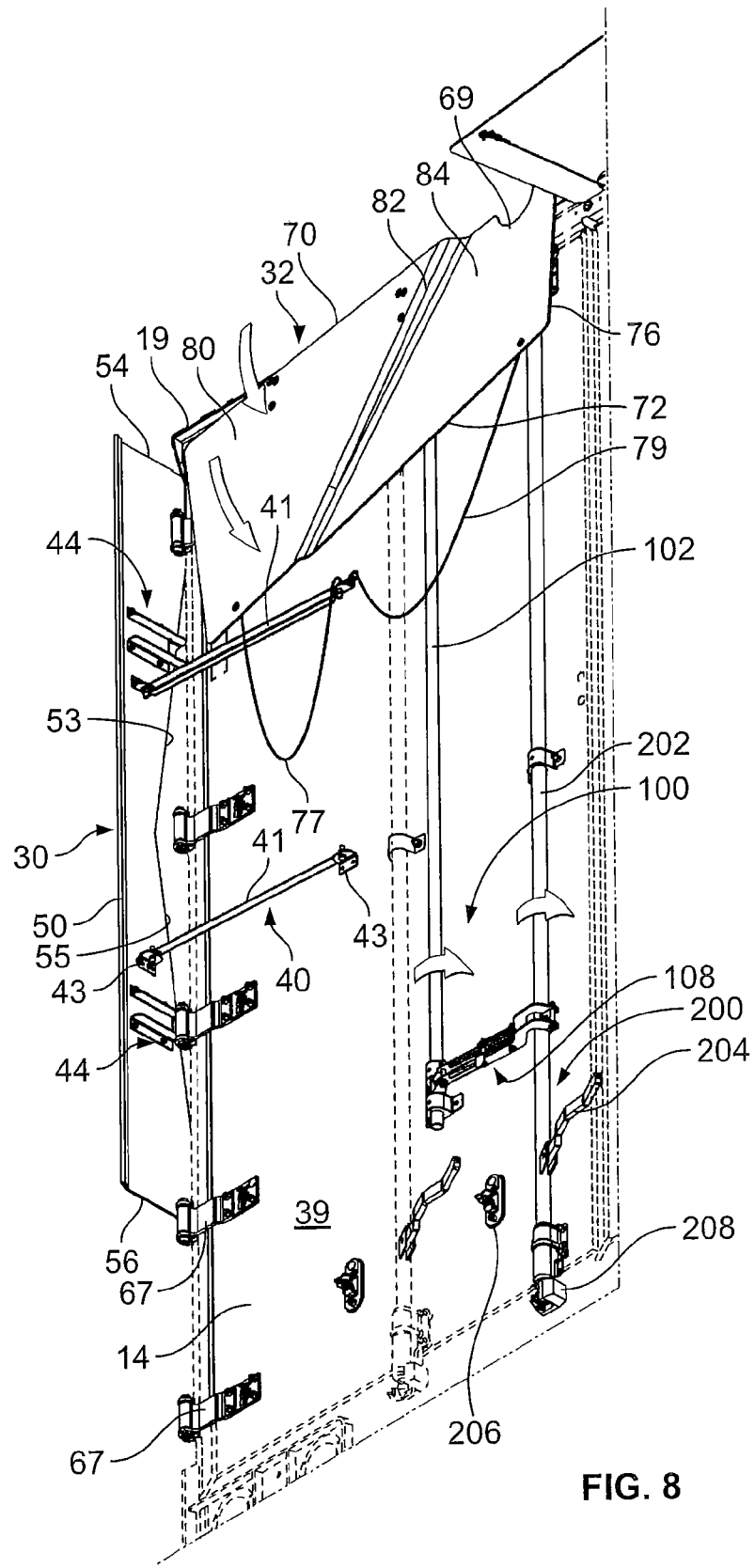

In order to move the top panel 32 between the fully-deployed and fully-folded positions, the rear drag reduction system 12 includes a folding mechanism 100 coupled to both the top panel 32 and the rear swing door 14. The folding mechanism 100 operates to move the top panel 32 from the deployed position extending away from the trailer 10 (as shown in FIGS. 5A and 5B) to a collapsed, or folded, position generally adjacent to the rear surface of the rear swing door 14 (as shown in FIG. 8). The folding mechanism 100 is coupled to a door locking mechanism 200 of the trailer 10 to move therewith. As is discussed in greater detail below, the folding mechanism 100 operates to automatically move the top panel 32 to the fully-folded position when a user moves the door locking mechanism 200 to an unlocked position in preparation for opening the rear swing door 14, for example.

Looking again to FIG. 5A, the folding mechanism 100 includes a vertically-extending deployment rod 102 coupled to the rear swing door 14 of the trailer 10 via brackets 104 and a first lever arm 106 (shown best in FIGS. 16-18) coupled at one end to the deployment rod 102 for rotational movement with the deployment rod 102 about a vertical axis defined by the deployment rod 102. A horizontally-extending linkage assembly 108 is pivotably coupled at a first end to the distal end of the lever arm 106 for rotation about a vertical pivot axis 107, and is pivotably coupled at a second end to a vertical lock-rod 202 of the door locking mechanism 200 via a bracket 111 defining a vertical pivot axis 109.

The folding mechanism 100 further includes a support arm 112 coupled to a top end of the deployment rod 102 for rotational movement therewith. The support arm 112 extends rearwardly away from the rear frame 13 of the trailer 10 when the rear drag reduction system 12 is in the fully-deployed position. A roller 113 of the support arm 112 is coupled to a distal end of the arm 112 to engage the bottom surface 31 of the lower portion 84 of the top panel 32. As such, the roller 113 of the support arm 112 is engaged with and supports the bottom surface 31 of the top panel 32 when the system 12 is in the fully-deployed position. As is discussed in greater detail below, rotation of the deployment rod 102 during operation of the folding mechanism 100 causes the support arm 112 to rotate therewith to a position where the top panel 32 is not supported thereon and is caused to pivot about the axis 98 of the hinges 90, 92 to its collapsed position. While the illustrative support arm 112 and roller 113 are shown and described herein, it should be understood that any similar arm, fin, or other structure may be coupled to the deployment rod 102 to rotate with the deployment rod 102 and support the top panel 32 thereon when the top panel 32 is in the fully-deployed position.

Figure 14:
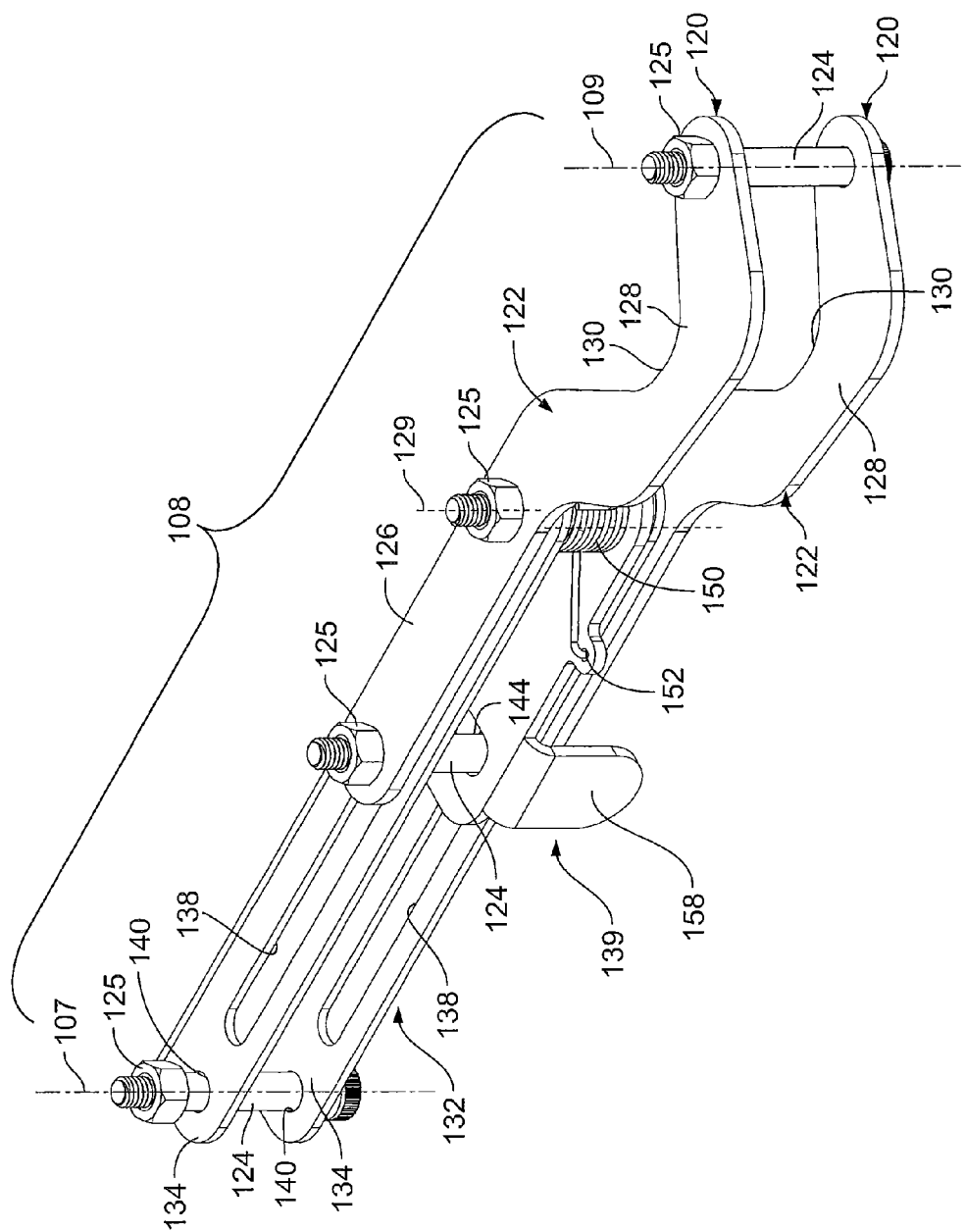
FIG. 14 is a perspective view of the horizontal, linkage assembly coupling the deployment rod to the lock-rod and showing a manual release mechanism of the linkage assembly.
Figure 15:
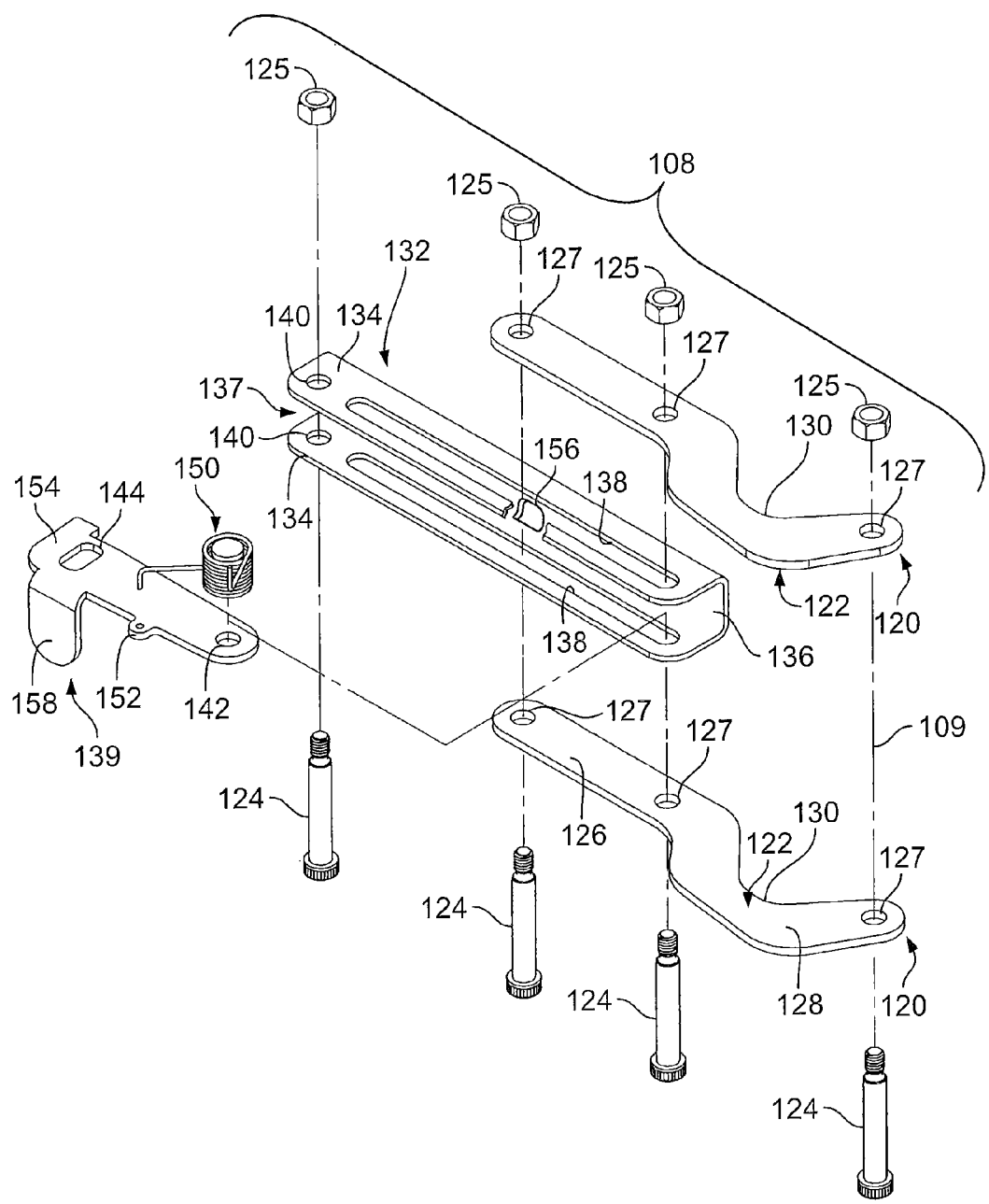
FIG. 15 is an exploded, perspective view of the horizontal linkage assembly of FIG. 14.

Looking now to FIGS. 14 and 15, the horizontally-extending linkage assembly 108 includes a first link 120 including two identical plates 122 spaced-apart from each other via three threaded pins 124 and accompanying nuts 125. The pins 124 are received through aligned apertures 127 of the plates 122. Each plate 122 includes a linear portion 126 and a curved, or hooked, portion 128 defining a curve 130. The pin 124 received through and coupled to the end of the curved portion 128 of each plate 122 is also coupled to the mounting bracket 111 rigidly attached to the lock-rod 202 of the door locking mechanism 200. This pin 124 operates to define the vertical pivot axis 109.

The linkage assembly 108 further includes a second link 132 coupled to and positioned between the upper and lower plates 122 of the first link 120. The second link 132 is generally U-shaped in cross-section and includes generally identical upper and lower plates 134 and a back plate 136 coupled to and positioned between each of the upper and lower plates 134 to define a channel 137 therein. Each of the upper and lower plates 134 of the second link 132 includes an elongated slot 138 and an aperture 140. Two of the pins 124 located through the linear portions 126 of the plates 122 of the first link 120 are received through the aligned, elongated slots 138 of the upper and lower plates 134 of the second link 132 in order to allow the second link 132 to slide laterally back and forth relative to the first link 120 along an axis defined by the slots 138 that is generally perpendicular to the vertical pivot axis 109. A fourth pin 124 is received through the apertures 140 of the second link 132 in order to couple the second link 132 to the lever arm 106 of the folding mechanism 100. As noted above, the lever arm 106 is rigidly coupled to the deployment rod 102 for rotational movement therewith. The fourth pin 124 pivotably coupling the lever arm 106 with the second link 132 defines the vertical pivot axis 107.

A manual release mechanism 139 is coupled to both the first link 120, the second link 132, and the two pins 124 received through the linear portion 126 of the plates 122 of the first link 120. The manual release mechanism 39 is positioned within the channel 137 of the second link 132. As is discussed in greater detail below, the manual release mechanism 139 allows a user to functionally disengage the folding mechanism 100 from the door locking mechanism 200 of the trailer 10 to allow the user to manually fold the top panel 32 to its collapsed position without unlocking the door locking mechanism 200. The manual release mechanism 139 includes a manual release lever 140 and a coil spring 150. An aperture 142 at one end of the manual release lever 140 receives one pin 124 therethrough while a slot 144 at the other end of the manual release lever 140 receives the other pin 124 therethrough. The slot 144 defines an axis perpendicular to the elongated slots 138 of the second link 132. The coil spring 150 is coupled at one end to the second link 132 and at the other end to a spring mount aperture 152 of the manual release lever 140.

The manual release lever 140 further includes a detent 154 normally received through a slot 156 formed in the back wall 136 of the second link 132. The coil spring 150 operates to bias the detent 154 to a locked position within the slot 156. The manual release lever 140 further includes a pull-tab 158 configured to be grasped by a user in order to pull the detent 154 rearwardly against the bias of the spring 150 out of the slot 156 to an unlocked position allowing the second link 132 to move relative to the first link 120. The coil spring 150 is aligned with the aperture 142 of the manual release lever 140 such that the corresponding pin 124 is received therethrough. This pin 124 defines a pivot axis 129 about which the manual release mechanism 139 pivots.

While the illustrative spring 150 is a coil spring, it should be understood that any biasing mechanism may be used in order to normally bias the manual release lever 140 to a locked position with the detent 154 received within the slot 156. As is discussed in greater detail below, the first and second links 120, 132 are normally in a locked position and do not move, or slide, laterally relative to each other. Rather, the links 120, 132 operate as a single unit during operation of the folding mechanism 100 to allow a user to manipulate the handle 204 of the door locking assembly 200 in order to automatically move the top panel 32 between fully-deployed and fully-folded positions. However, the manual release mechanism 139 is provided to allow a user to move the first and second links 120, 132 laterally relative to each other to rotate the deployment rod 102 and the lock-rod 202 relative to each other to move the top panel 32 from the fully-deployed position to the fully-folded position while maintaining the rear swing door 14 in a locked position.

In use, the rear drag reduction system 12 is automatically moved from its fully-deployed position to its fully-stowed position by the action of a user unlocking and fully opening the rear swing door 14 of the trailer 10 as shown in FIGS. 5A-13. In particular, the top panel 32 of the rear drag reduction system 12 is automatically moved from its fully-deployed position to its fully-folded position by action of a user unlocking the door locking mechanism 200 of the trailer 10 (as shown in FIGS. 5A-8); the side panel 30 and the fully-folded top panel 32 of the rear drag reduction system 12 are automatically moved to the fully-stowed position by action of a user opening the rear swing door 14 and pivoting the rear swing door 14 about its hinges 67 approximately 270 degrees to a stowed position adjacent the sidewall 11 of the trailer 10 (as shown in FIGS. 9-13).

Looking first to FIGS. 5A-8, the door locking mechanism 200 of the trailer 10 includes the lock-rod 202 extending generally the entire vertical length of the rear frame 13 and coupled to the rear swing door 14 for pivoting movement relative thereto. A handle assembly of the door locking mechanism 200 includes the handle 204 coupled to the lock-rod 202 and latch 206 is coupled to the rear door 14 to receive the handle 204 in a locked position. When the handle 204 is received within the latch 206, the lock-rod 202 is in a locked position where top and bottom ends of the lock-rod 202 are received within lock-rod keepers 208 coupled to the rear frame 13 of the trailer 10 to prevent the door 14 from being opened. In this extended position, the support arm 112 is extended rearwardly and supports the top panel 32 of the rear drag reduction system 12 in the fully-deployed position (as shown in FIGS. 5A and 5B).

As the handle 204 of the door locking mechanism 200 of the trailer 10 is removed from the latch 206 and rotated approximately 180 degrees, as shown by the arrow 201, the lock-rod 202 of the door locking mechanism 200 is also rotated approximately 180 degrees in a counterclockwise direction about the vertical axis defined by the lock-rod 202 itself. As noted above, the deployment rod 102 is coupled to the lock-rod 202 via the lever arm 106 and the horizontal linkage mechanism 108 for rotational movement with the lock-rod 202. In other words, the deployment rod 102 is "slaved" to the lock-rod 202 such that as the lock-rod 202 is rotated via a user rotating the handle 204, the deployment rod 102 is similarly rotated about the vertical axis defined by the deployment rod 102 itself. When the user rotates the handle 204 approximately 180 degrees (as shown in FIGS. 5A-8), the lock-rod 202 rotates approximately 180 degrees in a counterclockwise direction while the deployment rod 102 is caused to rotate approximately 100 degrees in the same counterclockwise direction.

The support arm 112 is rigidly coupled to the deployment rod 102. As such, the support arm 112 rotates about the pivot axis defined by the deployment rod 102 when the deployment rod 102 is urged to rotate. As shown in FIGS. 5A-8, as the deployment rod 102 rotates approximately 100 degrees, the support arm 112 also rotates approximately 100 degrees. Illustratively, therefore, the support arm 112 pivots approximately 100 degrees from the rearward, extended position supporting the top panel 32 thereon to an out-of-the-way, or stowed, position wherein a distal end of the support arm 112 is adjacent the rear swing door 14 of the trailer 10 to allow the top panel 32 to pivot downwardly (via gravity) to its folded position also generally adjacent to the rear swing door 14 of the trailer 10. The roller 113 rolls along the bottom surface 31 of the top panel 32 to its out-of-the-way, or stowed, position. As noted above, the top panel 32 is pivotably coupled to the rear swing door 14 by hinges 90, 92 to allow the top panel 32 to pivot relative to the rear swing door 14 about a slightly angled axis 98. While the angled axis 98 is shown and described herein, it should be understood that the axis about which the top panel 32 pivots may be angled at any suitable degree, or may be horizontal such that the axis is generally parallel to the rear edge 19 of the trailer 10.

As noted above, the top panel 32 automatically moves to a folded position when a user unlocks the door locking mechanism 200 of the trailer 10 by rotating the handle 204 of the door locking mechanism 200 approximately 180 degrees. Looking now to FIGS. 9-13, once the top panel 32 is moved to its fully-folded position, the top and side panels 32, 30 may together be automatically moved to their fully-stowed positions by movement of the rear swing door 14 to its fully-opened position. In particular, as the rear swing door 14 is opened and moved to its fully-opened position generally adjacent the sidewall 11 of the trailer 10 (whereby the rear swing door 14 is pivoted approximately 270 degrees), the side panel 30 of the rear drag reduction system 12 is automatically moved from its fully-deployed position extending rearward of the trailer 10 to its fully-stowed position adjacent the sidewall 11 of the trailer 10 between the sidewall 11 and the rear swing door 14 of the trailer 10.

As noted above, the side panel 30 is pivotably coupled to the rear swing door 14 via the first linkage mechanism 40 and is pivotably coupled to the sidewall 11 of the trailer 10 via the second linkage mechanism 44. As the rear door 14 is opened by a user, the first and second linkage mechanisms 40, 44 are urged to move the side panel 30 to its fully-stowed position. Further, as the rear door 14 is opened, the side panel 30 rotates approximately 180 degrees from its fully-deployed position to its fully-stowed position (as shown in phantom in FIG. 13) and also moves forward of the rear end of the trailer 10 such that no portion of the side panel 30 extends rearward of the trailer 10 when in the fully-stowed position.

As shown in FIGS. 9 and 10, the elongated rod 41 of the first linkage mechanism 40 is urged to pivot about both axes 45 while urging the side panel 30 to move outwardly and rearwardly about the pivot axis 47. As shown in FIGS. 10 and 12, the arm 48 of each of the second linkages 44 pivots at one end about the vertical axis 47 as the rear swing door 14 continues to rotate toward its fully-opened position. At the other end, the arm 48 is rigidly coupled to the inside surface 42 of the side panel 30. Thus, as the first linkage mechanisms 40 operate to push the side panel 30 as the rear swing door 14 is opened, the arm 48 of each of the second hinges 44 pivots about the vertical pivot axis 47 to flip the side panel 30 approximately 180 degrees to its fully-stowed position.

In the fully-stowed position, the side panel 30 of the rear drag reduction system 12 is positioned between the sidewall 11 of the trailer 10 and the top panel 32, and the top panel 32 is positioned between the side panel 30 and the rear swing door 14. Both the top and side panels 30, 32 of the rear drag reduction system 12 are located in an out-of-the-way position between the sidewall 11 and the rear swing door 14 of the trailer 10 as shown in FIG. 13.

Figure 13:
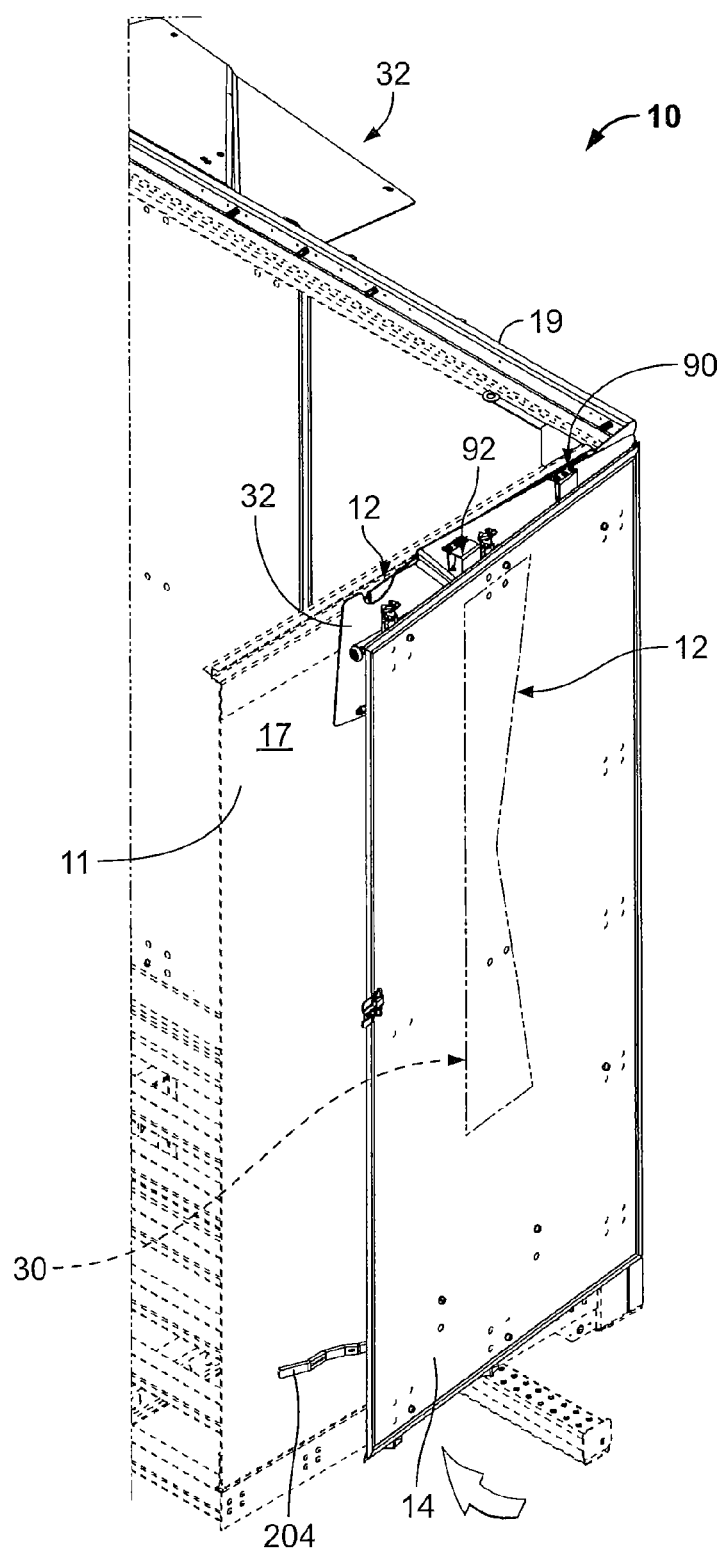

To move the rear drag reduction system 12 from the fully-stowed position shown in FIG. 13 to the fully-deployed position shown in FIG. 1, the user simply moves the rear swing door 14 to its closed position and moves the handle 204 of the door locking mechanism 200 to the locked position within the latch 206. In other words, when the user moves the rear swing door 14 to its closed position and locks the handle 204 of the door locking mechanism 200, the rear drag reduction system 12 is automatically moved to its fully-deployed position. In particular, as the rear swing door 14 is moved to its fully-closed position, the first and second linkage mechanisms 40, 44 operate to move, and flip, the side panel 30 from its stowed position to its fully-deployed position. Then, as a user rotates the handle 204 of the door locking mechanism 200 to a locked position in order to lock the rear swing door 14 to the rear frame 13, the deployment rod 102 is rotated in a clockwise position to move the support arm 112 to its extended, rearward position. As the support arm 112 moves from its stowed, out-of-the-way position adjacent the rear swing door 14 to its rearward position, the roller 113 of the support arm 112 moves along the bottom surface 31 of the top panel 32 to raise the top panel 32 from its folded, unsupported position to is extended position supported on the roller 113 of the support arm 112.

As noted above, the rear drag reduction system 12 also includes a manual release mechanism 139 which allows a user to move the top panel 32 from its fully-deployed position to its fully-collapsed position without moving the door locking mechanism 200 itself to the unlocked position. For example, there may be occasions when a user wants to maintain the doors 14 of the trailer 10 in a locked position while also collapsing the top panel 32 in order to park the rear end of the trailer 10 in close proximity to another object, for example. As shown in FIGS. 14-18, the folding mechanism 100 may be functionally disengaged from (though still coupled to) the door locking mechanism 200 by moving the manual release lever 140 of the manual release mechanism 139 from its normal locked position to an unlocked position.

Figure 16:
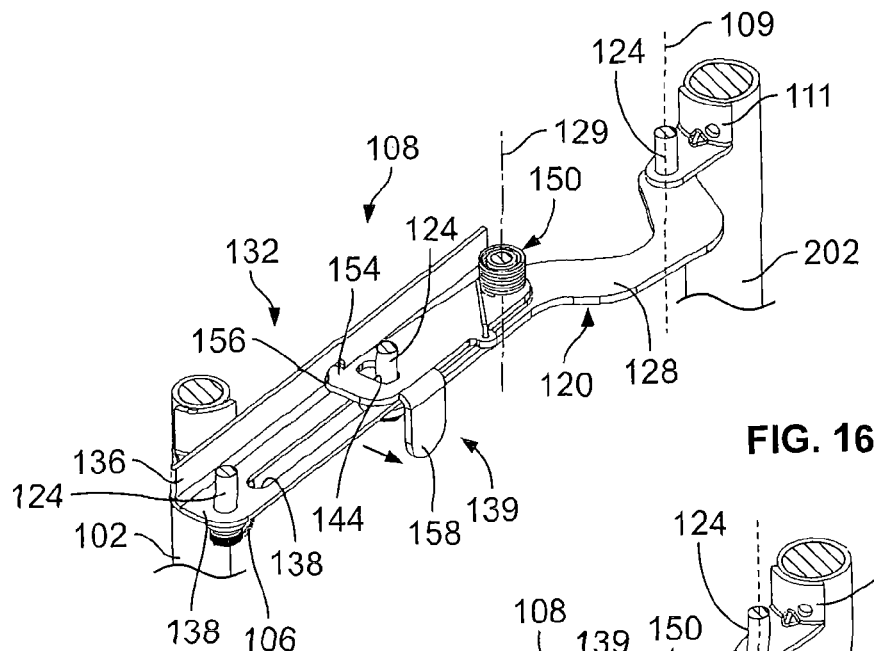
FIGS. 16-18 are perspective, sectional views of the deployment rod, lock-rod, and the horizontal linkage assembly of FIGS. 14 and 15 showing operation of the manual release mechanism to permit relative movement between a first and second link of the linkage assembly.
Figure 17:
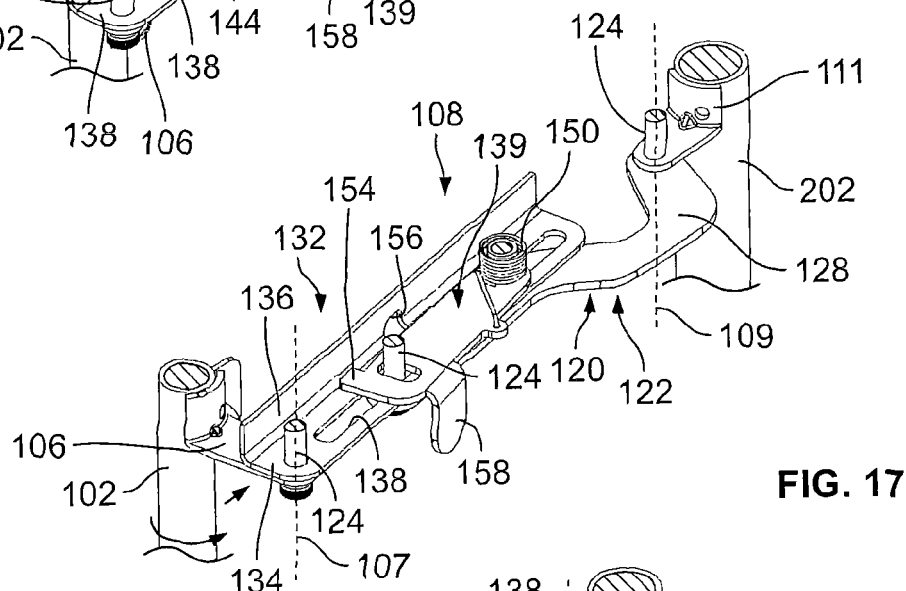
Figure 18:
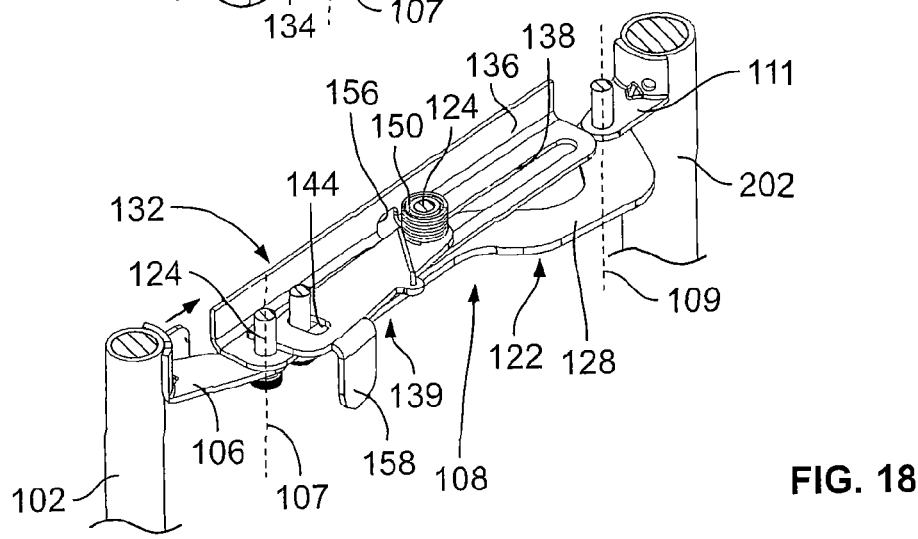

As shown in FIG. 14, for example, the manual release lever 140 is in its locked position such that the detent 154 is received with in the slot 156 of the second link 132 in order to cause the first and second links 120, 132 to move laterally in unison with each other as the lock-rod 202 of the door locking mechanism 200 is rotated. However, by pulling the tab 158 of the manual release lever 140 against the bias of the spring 150 away from the back wall 136 of the second link 132, the manual release lever 140 is moved to an unlocked position whereby the detent 154 is removed from within the slot 156 of the second link 132 (as shown in FIG. 16) to allow the second link 132 to move laterally relative to the first link 120. As shown in FIGS. 17 and 18, once the manual release lever 140 is moved to the unlocked position shown in FIG. 16 and the detent 154 is removed from within the slot 156, a user may manually slide the second link 132 laterally toward the lock-rod 202 of the door locking mechanism 200 to rotate the deployment rod 102 approximately 100 degrees without moving the first link 120 or rotating the lock-rod 202. As such, this rotation of the deployment rod 102 will rotate the support arm 112 approximately 100 degrees from its rearward position to its out-of-the-way position to allow the top panel 32 to pivot downwardly to its collapsed position. Thus, the top panel 32 is moved to its fully-deployed position without the use of the door locking mechanism 200.

Alternatively, a user may position the top panel 32 in its fully-folded position with the door locking mechanism 200 in its locked position by first rotating the handle 204 of the door locking mechanism 200 approximately 180 degrees in order to rotate the lock-rod 202 of the door locking mechanism 200 approximately 180 degrees to lower the top panel 32 to its fully-folded position (as is discussed in FIGS. 5A-8 above). If the user wants to maintain the top panel 32 in its fully-folded position while maintaining the doors 14 of the trailer 10 in a locked position, the user may pull the manual release lever 140 to the unlocked position whereby the detent 154 is removed from within the slot 156 of the second link 132 to allow the first and second links 120, 132 to move relative to each other. With the manual release lever 140 in the unlocked position, the user may then manually rotate the handle 204 back to its original, locked position in order to rotate the lock-rod 202 approximately 180 degrees in a clockwise direction toward the locked position without moving or otherwise manipulating the deployment rod 102 and top panel 32. In other words, the handle 204 may be moved back to the locked position while maintaining the top panel 32 in its fully-folded position. As such, the top panel 32 is positioned in the fully-folded position while the door locking mechanism 200 is in the locked position.

When the top panel 32 is in the collapsed position and the manual release mechanism 139 is in the unlocked position shown in FIG. 18 such that the second link 132 has been laterally moved toward the lock-rod 202 relative to the first link 120 which remained generally stationary, the manual release mechanism 139 will automatically return to its locked position upon activation by the user of the door locking mechanism 200 to the unlocked position. That is, as the handle 204 and the lock-rod 202 are rotated counter-clockwise approximately 180 degrees to an unlocked position, the bracket 111 is rotated therewith thus pulling the first link 120 (and the manual release mechanism 139 coupled thereto) laterally relative to the second link 132 until the detent 154 of the manual release mechanism 139 is aligned with the slot 156 of the second link 132 and biased by the spring 150 to be received therein to once again position the manual release lever 140 in its locked position to prevent relative movement between the first and second links 120, 132. Accordingly, when the user next locks the door locking mechanism 200, as described in detail above, the deployment rod 102 of the folding mechanism 100 will be urged to rotate with the lock-rod 202 to move the support arm 112 to its rearwardly-extending position thus raising the top panel 32 to its fully-deployed position once again.

Figure 26:
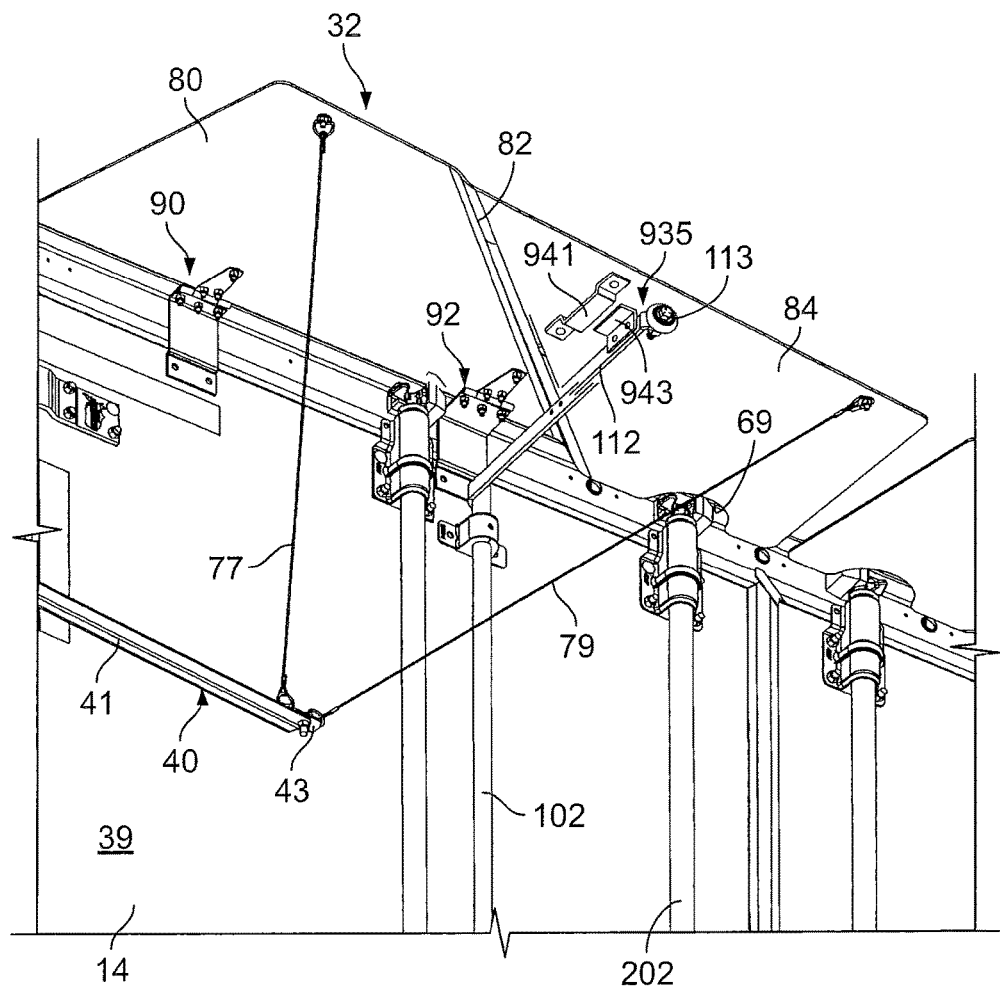
FIG. 26 is a perspective view of a portion of the rear drag reduction system of FIGS. 1-13 including a lock assembly to secure the support arm and the top panel to each other when the top panel is in the fully-deployed position.

Looking now to FIG. 26, in order to prevent vertical motion of the top panel 32, a top panel lock assembly 935 is provided. The top panel lock assembly 935 provides a mechanical interlock between the support arm 112 and the top panel 32. In particular the mechanism 935 includes a catch 941 coupled to the bottom surface 31 of the top panel 32 and an L-shaped flange 943 coupled to the outside surface of the support arm 112. As the support arm 112 rotates into the deployed position, the flange 943 coupled to the support arm 112 is received within a slot defined between the catch 941 and the bottom surface 31 of the top panel 32. Once the flange 943 is received within the slot of the catch 941, the top panel 32 is prevented from pivoting vertically upwardly away from the support arm 112 when the trailer 10 is traveling down the highway. Illustratively, while securement cables 77, 79 are shown in illustrative FIG. 26, it should be understood that the lock assembly 935 may be used without the cables 77, 79 as well.

As noted above, when the drag reduction system 12 is in the deployed position, the swing doors 14 of the trailer 10 are closed. The top and side panels 32, 30 of each of the two drag reduction systems 12 extend outwardly from the rear frame 13 and rear swing doors 14 in order to direct and smooth air flow around the rear end of the trailer 10 as the trailer 10 travels down the highway, for example. When the trailer 10 is not traveling on the road and it is necessary for a user or operator to open the rear doors 14 of the trailer 10 in order to gain access to the storage area of the storage container 15, the user need only unlock and open the doors 14 in the usual or typical manner and the drag reduction system 12 coupled to each door 14 automatically moves to its stowed position.

Further, in order to move the drag reduction system 12 to the deployed position, the user need only close and lock the rear doors 14 and the system 12 coupled to each door 14 automatically moves to its deployed position. In other words, it is not necessary to perform an extra step to move the drag reduction system 12 to the closed position prior to opening the trailer doors 14 or to move the drag reduction system 12 to the opened position after closing the doors 14. Rather, the drag reduction system 12 automatically moves to the stowed position upon unlocking and opening and locking the door 14 to which the drag reduction system 12 is attached and moving the door 14 to the fully opened position along the sidewall 11 of the trailer 10. It should be understood that the drag reduction systems 12 of the present disclosure may be used alone or in conjunction with other drag reduction systems such as, for example, aerodynamic side skirts such as those disclosed in U.S. Pat. No. 8,177,286 and U.S. Pat. No. 8,783,758, for example, the entirety of each of which is incorporated herein by reference.

Figure 19:
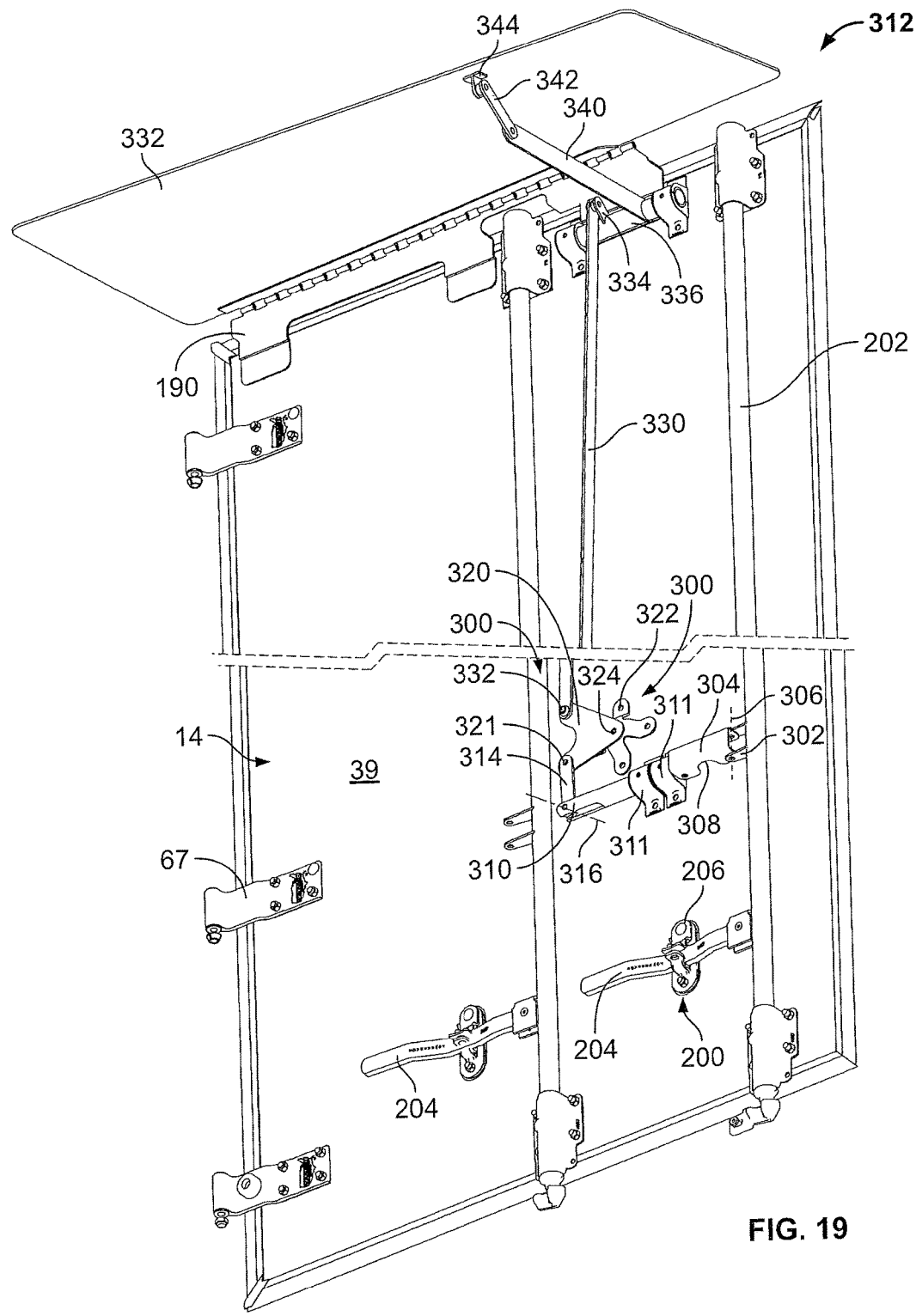
FIGS. 19-21 are rear perspective views of an alternative rear drag reduction system having an alternative bell-crank folding mechanism coupled to the lock-rod of the trailer to move the top panel between fully-deployed and fully-folded positions.
Figure 20:
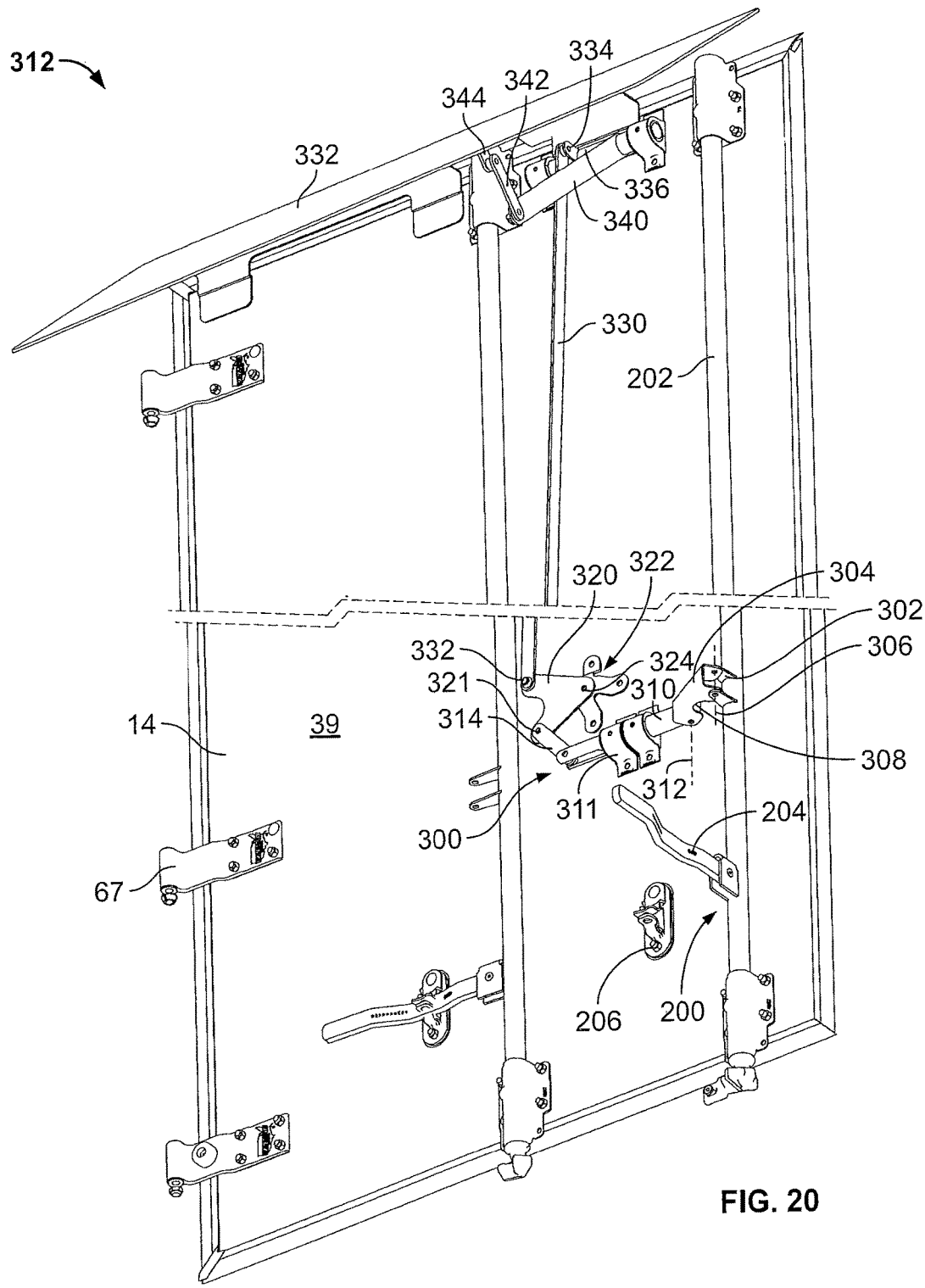
Figure 21:
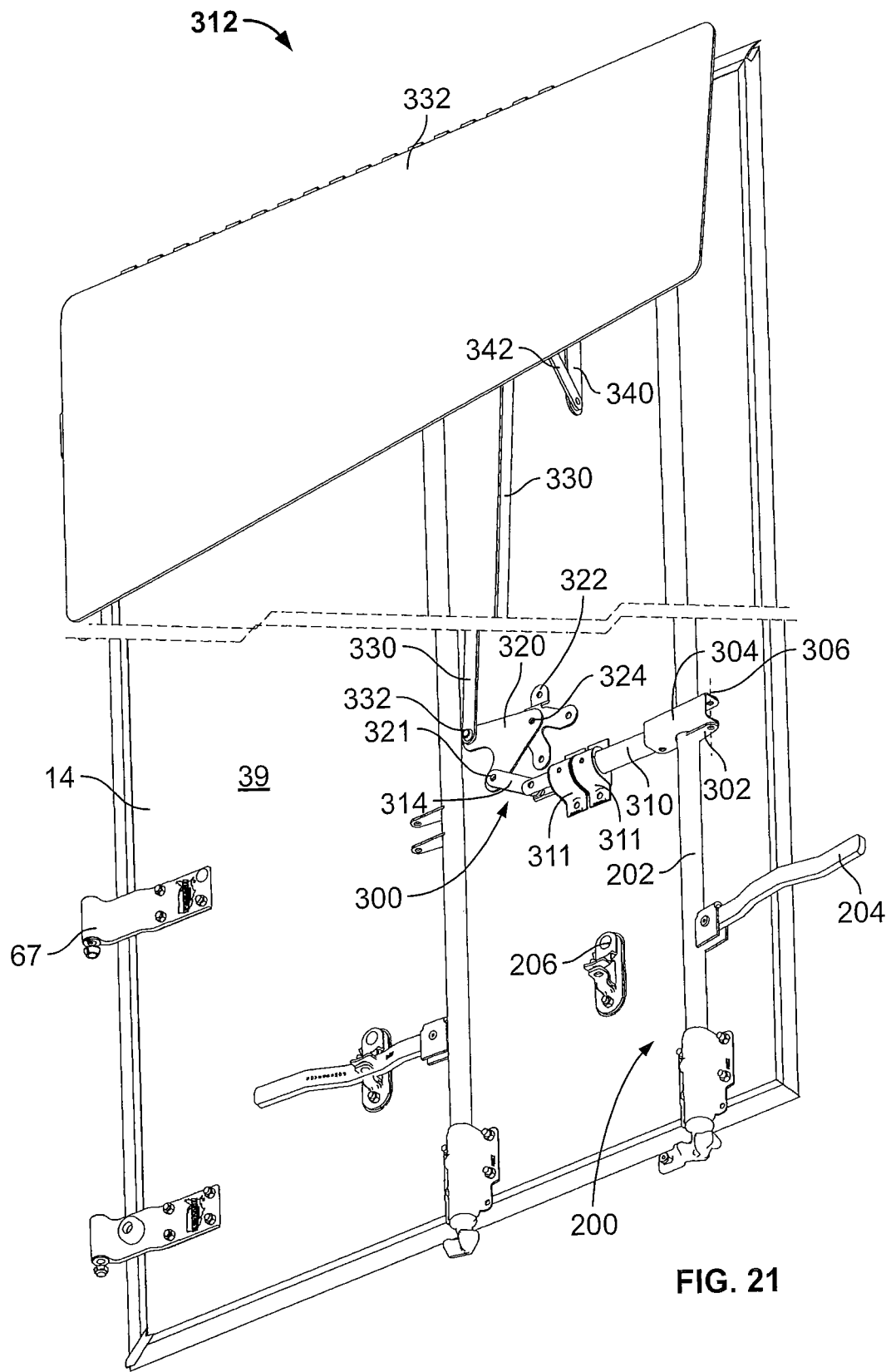

Looking now to FIGS. 19-21, a second, alternative folding mechanism 300 of an alternative rear drag reduction device 312 is provided. For purposes of this description, an alternative top panel 332 of the rear drag reduction device 312 is shown, and is shown on the left side of the trailer 10. The alternative top panel 332 is coupled to the top of the rear swing door 14 via an alternative hinge 190 for pivoting movement between fully-deployed and fully-folded positions relative thereto. It should be understood that the alternative folding mechanism 300 may also be used with the top panel 32 of rear drag reduction mechanism 12 of FIGS. 1-18 and/or any top panel described herein. Accordingly, like reference numbers are used to denote like components. The alternative folding mechanism 300 is a bell crank folding mechanism coupled to the lock-rod 202 of the door locking mechanism 200 of the trailer 10. Similar to the folding mechanism 100 discussed above, the alternative folding mechanism 300 is actuated by rotating the door lock-rod 202 approximately 180 degrees.

Illustratively, the bell crank folding mechanism 300 includes a lever arm 302 extending outwardly from the lock-rod 202 for rotational movement therewith. The lever arm 302 is pivotably coupled to the first end of a first, horizontal rocker link 304 for pivoting movement about a vertical pivot axis 306. The first, horizontal link includes a curved cut-out portion 308 configured to receive the lock-rod 202 therein when the handle 204 of the door locking mechanism 200 has been rotated 180 degrees, as shown in FIG. 21. The second end of the first, horizontal link rocker link 304 is pivotably coupled to a first end of a second, horizontal sliding link 310 for pivoting movement relative thereto about a vertical axis 312. The sliding link 310 is illustratively received through two bearings 311 mounted to the rear door 14. Rotation of the lock-rod 202 causes the first and second horizontal links 304, 310 to move laterally. Thus, the horizontal links 304, 310 define a linkage mechanism similar to the linkage mechanism 108 described above.

The second end of the second, horizontal link 310 is coupled to a connector link 314 (which is in a vertical position when the top panel 332 is in the fully-deployed position as shown in FIG. 19) for pivoting movement about an axis 316 extending generally parallel to a longitudinal axis of the trailer 10. The other end of the link 316 is pivotably coupled to one corner of a generally triangular plate 320 at a pivot point 321. The plate 320 is pivotably coupled at another corner to the rear door 14 of the trailer 10 via a bracket 322 at a pivot point 324. The third corner of the triangular plate 320 is coupled to an elongated actuator link 330 at a pivot point 332 which extends upwardly toward the top end of the rear swing door 14. The actuator link 330 is similar in position and function to the deployment rod 102 described above with regard to the folding mechanism 100. The upper end of the elongated actuator link 330 is pivotably coupled to a first lever arm 334 that is rigidly coupled to a horizontally-extending bar 336 configured to rotate about its own longitudinal axis. A second lever arm 340 is rigidly coupled to the bar 336 at one end for rotational movement therewith. The other end of the second lever arm 340 is pivotably coupled to a link 342 which is also pivotably coupled to the bottom surface 31 of the top panel 32 via a bracket 344.

As shown in FIGS. 19-21, rotational movement of the lock-rod 202 caused by movement of the handle 204 of the door locking mechanism 200 from a locked position to an unlocked position causes the links, bars, and plates described above to automatically move the top panel 32 to its fully-folded position. Similarly, rotational movement of the lock-rod 202 caused by movement of the handle 204 of the door locking mechanism 200 from an unlocked position to a locked position operates to automatically move the top panel 32 to its fully-deployed position supported by the links 342 and 340. In other words, the alternative bell crank folding mechanism 300 operates to translate the rotational movement of the vertical lock-rod 202 to rotational movement of the horizontal bar 336 adjacent the top edge of the door 14. Rotational movement of the horizontal bar 336 operates to move the arms 340, 342 between generally rearwardly-extending positions to support the top panel 332 thereon to generally downwardly-extending positions wherein the top panel 332 is in its collapsed position.

Figure 24:
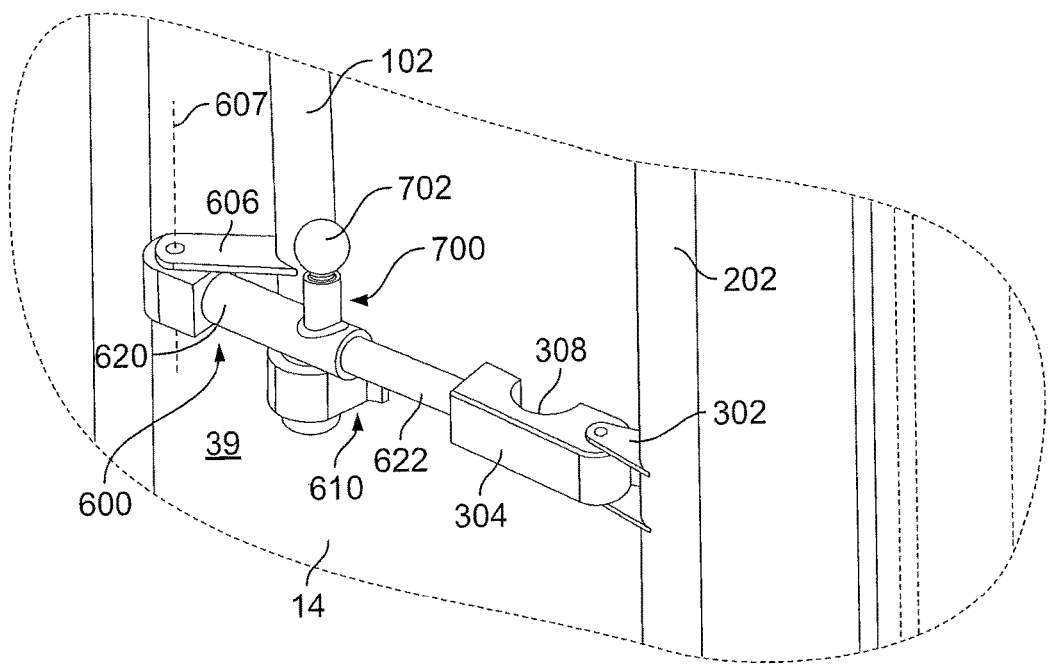
FIG. 24 is a perspective view of a portion of an alternative horizontal linkage assembly including an alternative manual release mechanism configured to allow a user to manually move the top panel to a fully-folded position without actuating the lock-rod of the door locking mechanism.
Figure 25:
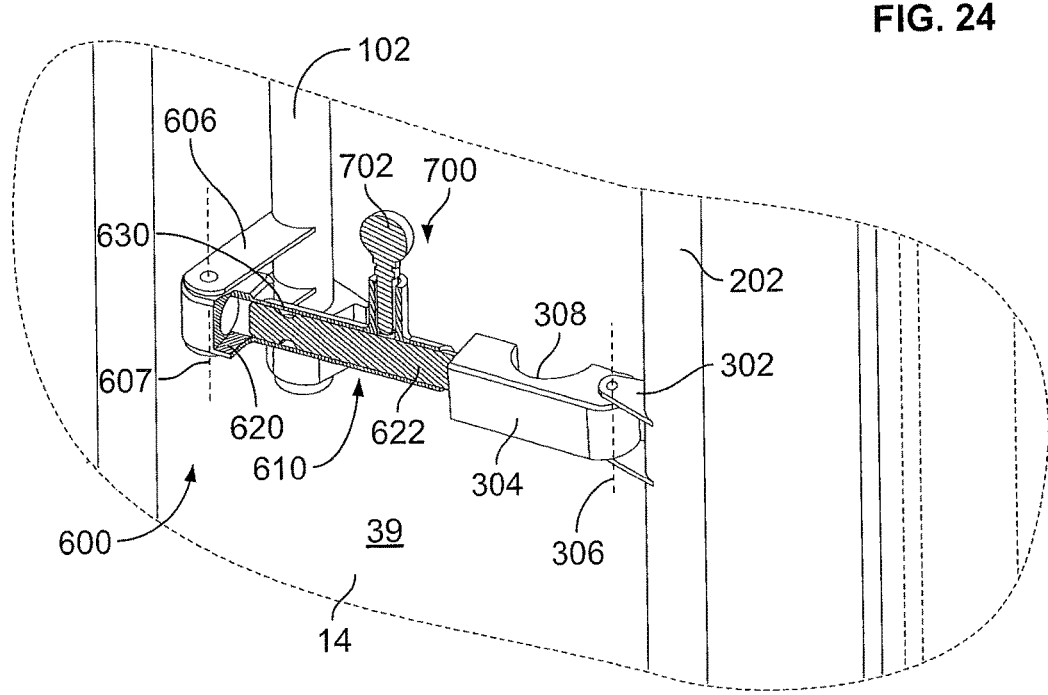
FIG. 25 is a perspective (and partly sectional) view of the alternative manual release mechanism of FIG. 24 in an unlocked position showing the spring-loaded button having been pulled upwardly to allow the links to slide relative to one another.

Looking now to FIGS. 24 and 25, an alternative folding mechanism 600 having a manual release mechanism 700 is provided. This folding mechanism 600 is similar to both the folding mechanism 100 and the folding mechanism 300. As such, like reference numbers are used to denote like components. In particular, the folding mechanism 600 includes the lever arm 302 coupled to the lock-rod 202 and the rocker link 304 for pivoting movement about the vertical axis 306. A linkage 610 is coupled at one end to the rocker link 304 and is pivotably coupled at another end to a lever arm 606 at a pivot axis 607. The lever arm 606 is rigidly coupled to the deployment rod 102 for rotation therewith. The linkage 610 is movable between a locked position shown in FIG. 24 whereby an outer sleeve 620 and an inner rod 622 are not movable relative to each other, and an unlocked position shown in FIG. 25 where the outer sleeve 620 and inner rod 622 are laterally movable relative to each other.

The linkage 610 includes a manual release mechanism 700 in order to allow a user to manually move the top panel 32 to a folded position when the rear door 14 is in the closed position without moving or disengaging the lock-rod 202. The manual release mechanism 700 operates in a similar manner as the manual release mechanism 139 described above. In particular, the manual release mechanism 700 includes a spring-loaded latch 702 coupled to the linkage 610. In particular, the latch 702 is received within a notch 630 within the inner rod 622 when in the locked position in order to prevent relative movement between the outer sleeve 620 and the inner rod 622. When the latch 702 is actuated (i.e., removed from within the notch 630), a user is able to manually rotate the support arm 112 (and thus the deployment rod) to the side, without rotating the lock-rod 202, in order to allow the top panel 32 to be pivoted downwardly to its folded position. As shown in FIGS. 24 and 25, when the latch 702 is raised upwardly, the inner rod 622 is able to be moved relative to the outer sleeve 620 without rotating, or otherwise engaging, the lock-rod 202. Similar to the manual release mechanism 139 described above, the manual release mechanism 700 resets itself automatically with the next use of the lock-rod 202, thus resulting in no additional work when needed to move the top panel 32 back to the fully-deployed position.

It should be understood that while the illustrative folding mechanisms 100, 300, 600 of the present disclosure are shown and described herein in order to "slave" the actuation or movement of any of the top panels disclosed herein to the movement of the door locking mechanism 200, it is within the scope of this disclosure to provide any suitable configuration of linkage type mechanisms between the lock-rod 202 and the top panel 32, 332 to translate the rotational motion of the lock-rod 202 of the door locking mechanism 200 to movement of the top panel 32 between fully-deployed and fully-folded positions. In other words, it should be understood that the rear drag reduction system 12 includes any suitable folding mechanism coupled to the door locking mechanism 200 of the trailer 10 to automatically actuate and move the top panel 32 of the rear drag reduction system 12 between fully-deployed and fully-folded positions via movement of the lock-rod 202 of the door locking mechanism 200.

Figure 22:
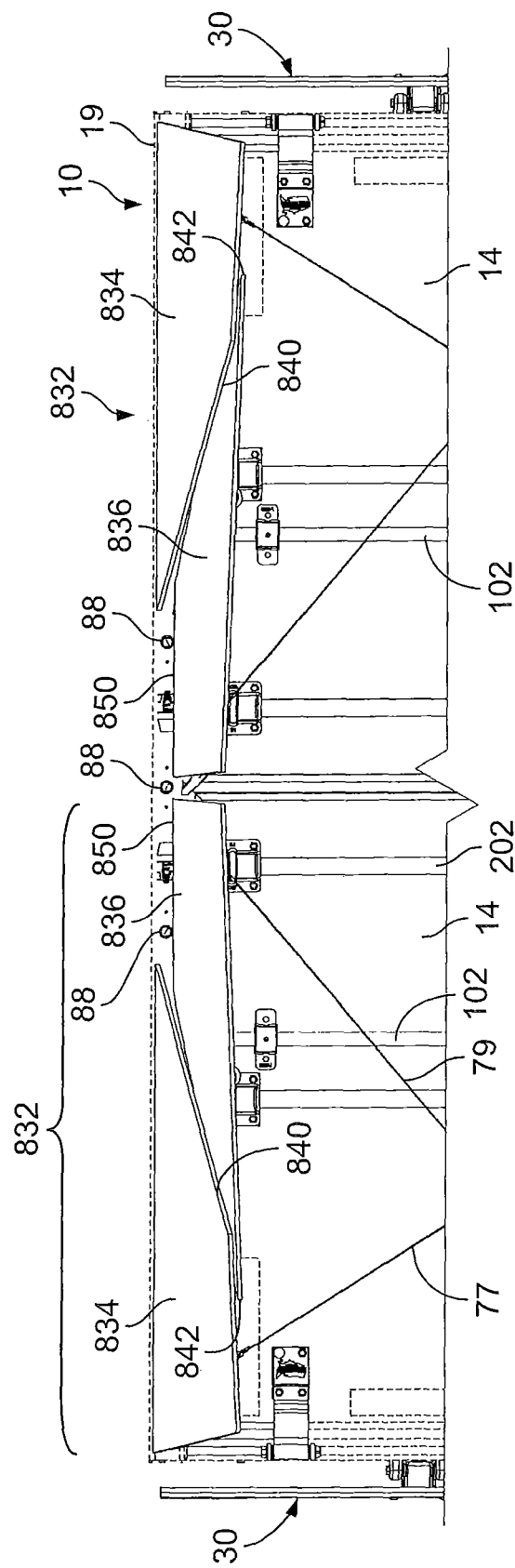
FIG. 22 is a rear view of an alternative top panel of the present disclosure including two separate panel portions extend rearwardly from the rear swing door.
Figure 23:
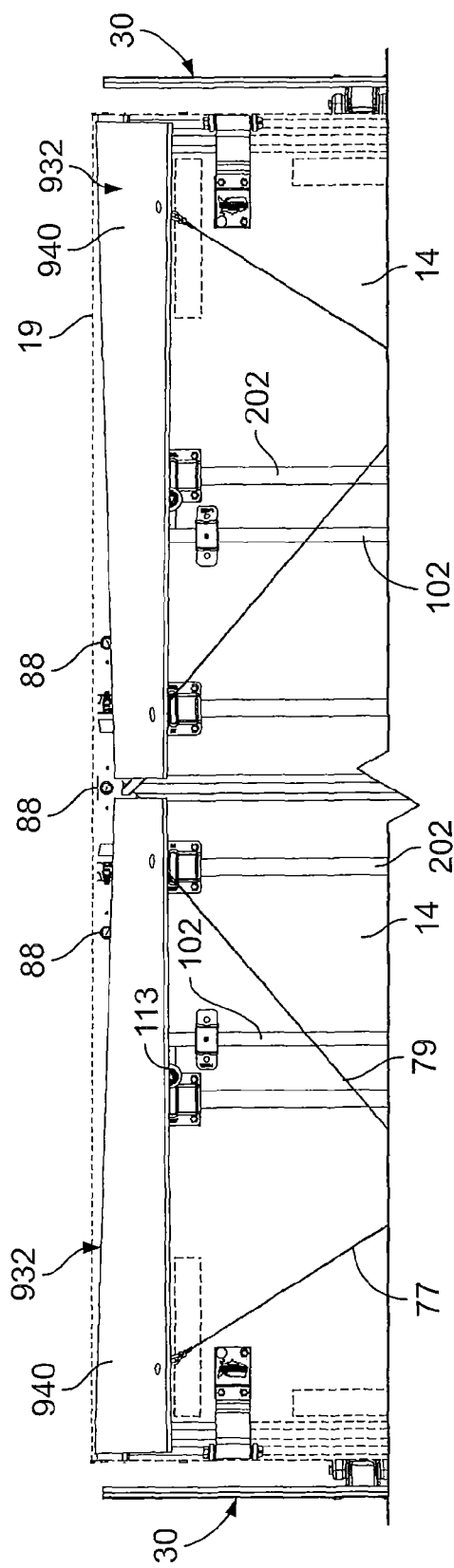
FIG. 23 is a rear view of another alternative top panel of the present disclosure angled downwardly from an outer edge to an inner edge thereof in order to provide visual clearance for the center, upper identification lights of the trailer.

Looking now to FIGS. 22 and 23, the rear drag reduction device 12 may also include alternative top panels such as those alternative panels 832, 932 shown and described herein. While the particular top panel 32 described above and shown in FIGS. 1-13 operates to allow a driver traveling behind the trailer 10 of the present disclosure to see the identification lights 88 of the trailer 10 and the light emanated therefrom from a line of site approximately 10 degrees angled downwardly from the center, identification lights 88 and 45 degrees to the left and right of the lights 88, the alternative top panels 832, 932 shown in FIGS. 22 and 23 also provide this same visibility of the indicator lights 88.

The top panel 832 of FIG. 22 includes an upper panel 834 that is mounted flush with the rear edge 19 of the trailer 10. The top panel 832 also includes a lower panel 836 that is mounted with a rear edge 850 just below the indicator lights 88. When in the fully-deployed position, the lower panel 836 operates to support the upper panel 834 thereon. As such, the lower panel 836 is generally positioned at a shallower angle than that of the upper panel 834. Illustratively, the lower panel 836 may be positioned at an angle of approximately between 12-15 degrees while the upper panel 834 may be positioned at an angle of approximately 13-16 degrees. Accordingly, the panels 834, 836 may also be positioned at the same angle to be parallel to each other. Further, because the upper panel 834 is supported by the lower panel 836, movement of the lower panel 836 between deployed and folded positions also operates to move the upper panel 834 between the deployed and folded positions. The panels 834, 836 are similar in shape and size to the portions 80, 84 of the top panel 32. However, the panels 834, 836 are not coupled to each other. Illustratively, the top panel 834 includes an angled inner edge 840 and the lower panel 836 includes an angled inner edge 842 positioned outwardly of the edge 840 of the top panel 834.

Another alternative top panel 932 is shown in FIG. 23. Illustratively, the top panel 932 is defined by a single sheet or panel which is angled downwardly from the side of the trailer 10 towards the center of the trailer 10. This downward slope allows the top, center indicator lights 88 to be visible above a top surface 940 of the panel 932. As shown in FIG. 23, the outer corner of the top panel 932 is generally flush with the top edge 9 of the trailer 10 while the forward, inner corner of the top panel 932 is positioned below the indicator lights 88.

Further illustratively, an alternative top panel (not shown) may be mounted such that a forward edge of the top panel is mounted flush with the top of the trailer 10. Such an alternative top panel may be made of a translucent or transparent material in order to allow light to pass through the top panel.

Illustratively, each wall panel 30, 32 is made of a composite material. For example, the composite material may include a plastic core and metal outer skins coupled to the plastic core. Such a composite material provides a rigid, but lightweight and durable material. Illustratively, for example, each wall panel 30, 32 may be made of a DURAPLATE® composite panel provided by Wabash National Corporation of Lafayette, Ind. DURAPLATE® composite panels are constructed of a high-density polyethylene plastic core bonded between two high-strength steel skins.

The inner and outer skins respectively may be formed of a metal or metallic composition, examples of which include, but should not be limited to aluminum, galvanized steel, full hardened steel, such as AISI Grade E steel, or the like. In one illustrative embodiment, for example, the outer skin is formed of ASTM G90 galvanized steel, and the inner skin is formed of ASTM G40 galvanized steel. In alternative embodiments, the inner and/or outer skins respective may be formed of other rigid, semi-rigid, metallic or non-metallic materials. Illustratively, the composite material (i.e., panels 30, 32) is approximately between 0.08 inch and 0.20 inch thick, with a preferred thickness of approximately 0.10 inch thick. While the illustrative panels 30, 32 disclosed herein are each made of the particular composite material described above, it should be understood that other suitable composite materials may be used as well. For example, the panels 30, 32 may also be made from a plastic pultrusion with fiber reinforcements embedded inside the polymer material. The reinforcement fibers may be made from glass, carbon, and/or other suitable materials, for example.

It should be further understood that while the illustrative panels 30, 32 disclosed herein are made from a composite, the panels 30, 32 may alternatively be formed from a non composite material such as a sheet made from a metal, metal alloy, or plastic, for example. The panels 30, 32 may be made from ferrous or nonferrous materials including plastics or composites incorporating a combination of ferrous and/or nonferrous materials thereof. In particular, an alternative panel (not shown) may be made from galvanized steel. Of course, it is within the scope of this disclosure to include non-galvanized steel sheets, or other such non-composite panels, of any suitable thickness as well.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. In particular, it should be understood that the while certain illustrative top panels are disclosed herein, the rear drag reduction system of the present disclosure may include any suitable top panel configured to move between a fully-deployed and a fully-folded position. Further, the rear drag reduction system of the present disclosure may include any suitable folding mechanism coupled to the door locking mechanism 200 of the trailer 10 to automatically move the top panel between the fully-deployed and fully-folded positions. Finally, the folding mechanism of the present disclosure may include any suitable manual release mechanism to functionally uncouple the folding mechanism from the door locking mechanism of the trailer 10.

What is claimed is:

1. An aerodynamic rear drag reduction system configured to be coupled to a rear frame assembly of a trailer including a rear frame and the rear swing door, the drag reduction system comprising:
   a top panel configured to be coupled to a top portion of a rear swing door of the trailer to extend generally horizontally along a top portion of a rear frame assembly of the trailer; and
   a folding mechanism coupled to the top panel to move the top panel between (i) a fully-deployed position wherein the top panel is configured to extend generally rearwardly away from the rear end of the trailer and (ii) a fully-folded position wherein a bottom surface of at least a portion of the top panel is configured to lie generally adjacent the rear swing door of the trailer, wherein the folding mechanism is configured to be coupled to a door locking mechanism of the trailer, and wherein the folding mechanism is automatically actuated as a result of movement of the door locking mechanism.

2. The aerodynamic rear drag reduction system of claim 1, wherein movement of a handle of the door locking mechanism from a locked position to an unlocked position automatically moves the top panel from the fully-deployed position to the fully-folded position.

3. The aerodynamic rear drag reduction system of claim 2, wherein movement of the handle of the door locking mechanism from the unlocked position to the locked position automatically moves the top panel from the fully-folded position to the fully-deployed position.

4. The aerodynamic rear drag reduction system of claim 1, wherein the folding mechanism is configured to be coupled to a lock-rod of the door locking mechanism, and wherein rotational movement of the lock-rod automatically actuates the folding mechanism.

5. An aerodynamic rear drag reduction system configured to be coupled to a rear frame assembly of a trailer including a rear frame and the rear swing door, the drag reduction system comprising:
   a top panel configured to be coupled to a top portion of a rear swing door of the trailer to extend generally horizontally along a top portion of a rear frame assembly of the trailer; and
   a folding mechanism coupled to the top panel to move the top panel between (i) a fully-deployed position wherein the top panel is configured to extend generally rearwardly away from the rear end of the trailer and (ii) a fully-folded position wherein a bottom surface of at least a portion of the top panel is configured to lie generally adjacent the rear swing door of the trailer,
   wherein the folding mechanism is configured to be coupled to a door locking mechanism of the trailer, and wherein the folding mechanism is automatically actuated as a result of movement of the door locking mechanism, and
   wherein the folding mechanism includes (i) a linkage assembly configured to be coupled to a vertical lock-rod of door locking mechanism, (ii) a vertically-extending deployment rod coupled to the linkage assembly of the trailer, and (ii) a support arm coupled to the deployment rod, wherein the top panel is supported by the support arm when the top panel is in the fully-deployed position.

6. The aerodynamic rear drag reduction system of claim 5, wherein rotation of the vertical lock-rod moves the linkage assembly linearly, and wherein linear movement of the linkage assembly rotates the deployment rod.

7. The aerodynamic rear drag reduction system of claim 6, wherein the support arm is rigidly coupled to the deployment rod at a first end, and wherein the support arm is movable between an extended position wherein the support arm extends rearwardly from the trailer to support the top panel thereon, and a stowed position wherein a distal end of the support arm is configured to be positioned generally adjacent the rear swing door of the trailer.

8. The aerodynamic rear drag reduction system of claim 7, wherein rotation of the deployment rod causes the support arm to move between the extended position and the stowed position.

9. The aerodynamic rear drag reduction system of claim 7, further comprising a roller coupled to the distal end of the support arm.

10. The aerodynamic rear drag reduction system of claim 5, wherein the linkage assembly includes a manual release mechanism configured to be moved from (i) a locked position wherein the linkage assembly is configured to translate rotational movement of the lock-rod to rotational movement of the deployment rod to (ii) an unlocked position wherein the linkage assembly is not configured to translate rotational movement of the lock-rod to rotational movement of the deployment rod.

11. The aerodynamic rear drag reduction system of claim 5, wherein the linkage assembly includes a first link coupled to the deployment rod, a second link coupled to the first link and configured to be coupled to the lock-rod of the door locking mechanism, and a manual release mechanism coupled to the first and second links, wherein the manual release mechanism is movable between a locked position wherein the first and second links are not movable relative to each other and an unlocked position wherein the first and second links are configured to move relative to each other.

12. An aerodynamic rear drag reduction system configured to be coupled to a rear frame assembly of a trailer including a rear frame and a rear swing door, the drag reduction system comprising:
   a top panel configured to be pivotably coupled to a top portion of the rear swing door of the trailer to extend generally horizontally along a top portion of the rear frame assembly of the trailer, wherein the top panel is movable between a fully-deployed position wherein the top panel is configured to extend generally rearwardly away from the rear end of the trailer and a fully-folded position wherein a bottom surface of at least a portion of the top panel is configured to lie generally adjacent the rear swing door of the trailer,
   wherein the top panel includes an upper portion having a forward edge positioned above a top edge of the rear swing door and generally aligned with a top edge of the rear frame assembly of the trailer and a lower portion having a forward edge positioned generally above the top edge of the rear swing door and generally below the top edge of the rear frame assembly of the trailer, wherein the upper portion of the top panel defines a first plane in the deployed position and the lower portion of the top panel defines a second plane in the deployed position that is spaced-apart from the first plane.

13. The aerodynamic rear drag reduction system of claim 12, wherein the upper portion and the lower portion are generally parallel to each other.

14. The aerodynamic rear drag reduction system of claim 12, wherein the forward edge of the lower portion is configured to be positioned adjacent to and below rear upper identification lights of the trailer.

15. The aerodynamic rear drag reduction system of claim 12, wherein the top panel further includes a step coupled to and positioned between each of the upper and lower portions.

16. The aerodynamic rear drag reduction system of claim 15, wherein the step extends diagonally outwardly from a forward edge of the top panel to a rearward edge of the top panel.

17. The aerodynamic rear drag reduction system of claim 12, wherein the entire forward edge of the lower portion is adjacent to and positioned generally above the top edge of the rear swing door.

18. The aerodynamic rear drag reduction system of claim 12, wherein the top panel is configured to pivot between the fully-deployed position and the fully-folded positions about a pivot axis, and wherein the pivot axis is angled relative to the top edge of the rear frame assembly.

19. The aerodynamic rear drag reduction system of claim 18, wherein the pivot axis is angled toward a rearward edge of the top panel as the pivot axis extends from the outer edge to the inner edge of the top panel.

20. A method of operating a top panel of an aerodynamic rear drag reduction system configured to be coupled to a rear frame assembly of a trailer including a rear frame and a rear swing door, the steps comprising:

automatically moving the top panel between a fully-deployed position wherein the top panel is configured to extend generally rearwardly away from the rear end of the trailer and a fully-folded position wherein the top panel is configured to lie generally adjacent the rear swing door of the trailer when a door locking mechanism of the trailer is moved from a locked position to an unlocked position.

21. The aerodynamic rear drag reduction system of claim 12, wherein upper portion is positioned outwardly from the lower portion.

22. The aerodynamic rear drag reduction system of claim 1, wherein the folding mechanism includes a support arm having a roller at a distal end thereof, and wherein the top panel is engaged with and supported on the top panel when the top panel is in the fully-deployed position.

\* \* \* \* \*